United States Patent [19]

Lemelson

[11] 4,213,163

[45] Jul. 15, 1980

[54] VIDEO-TAPE RECORDING

[76] Inventor: Jerome H. Lemelson, 85 Rector St., Metuchen, N.J. 08840

[21] Appl. No.: 225,173

[22] Filed: Aug. 27, 1962

Related U.S. Application Data

[63] Continuation-in-part of Ser. No. 668,348, Jun. 27, 1957, Pat. No. 3,051,777.

[51] Int. Cl.² ............................................. H04N 5/78
[52] U.S. Cl. ........................................ 360/35; 360/13
[58] Field of Search ............ 178/6.6 A; 179/100.2 T, 179/100.2 E; 360/13, 35

[56] References Cited

U.S. PATENT DOCUMENTS

| | | | |
|---|---|---|---|
| 2,295,000 | 9/1942 | Morse | 361/183 |
| 2,671,377 | 3/1954 | Downes | 358/215 |
| 2,721,990 | 10/1955 | McNaney | 358/102 |
| 2,947,978 | 8/1960 | Poylo | 360/1 |
| 3,017,610 | 1/1962 | Auerbach | 360/39 |
| 3,025,344 | 3/1962 | Bosustow | 360/14 |
| 3,036,291 | 5/1962 | Whittle | 358/256 |
| 3,084,215 | 4/1963 | Bounsall | 360/14 |

Primary Examiner—Howard W. Britton

[57] ABSTRACT

Single frame video signals are recorded on selected areas of a recording medium, with accompanying recorded code signals associated with each frame.

25 Claims, 11 Drawing Figures

VIDEO-TAPE RECORDING

This application is a continuation-in-part of my copending application Ser. No. 668,348 filed June 27, 1957, now U.S. Pat. No. 3,051,777.

This invention relates to video signal storage systems and more particularly to methods of single frame recording on selected areas of a recording medium and the playback of selected signals as single frame presentations or as a motion picture.

Heretofore, video recording and reproduction has been limited in scope to the transducing on or from magnetic tape of a succession of frames in the form of a continuously generated video information signal produced by a video scanning camera during an extended period of time in which said camera is driven by a free running sync signal generator or is locked into and driven by power line alternating current. While this sufficiently serves the desired end of providing an elongated signal which is a motion picture recording of events as they occur, other realms of recording such as the fields of business record storage and animated cartooning, and the temporary storage of a picture record in the form of discrete signals of different still image fields or frames cannot be accomplished by the conventional video tape recording and reproduction apparatus.

Hereinafter described are methods and apparatus for magnetically recording and visually reproducing thereafter picture information, such as a document or a single page of a business record, in the form of a single video beam trace signal of said page, or double trace in the case of interlaced scanning. This single frame signal, transmitted from a video camera, is recorded on a moving magnetic tape in a predetermined location thereon. Other page information recordings or video picture signals are recorded in tandem on the tape. At a later time, when this page is to be referred to, a selector means such as a pushbutton, or dial selector or other controller is set to a code position or condition corresponding to the tape position on which the desired information is recorded and reproduction of said page as an image on a video screen is effected by subsequent operations of the system occuring in a predetermined sequence. Initially, the tape drive is started and marker signals are reproduced or read by a pickup head. Said marker signals may be recorded at intervals along the tape and provided thereon prior to subsequent video picture signal recording or the frame sync signal of the prior recorded frame may be recorded adjacent said frame signal to function as a marker signal. The reproduction transducer or pick-up head for said marker signals transmits pulses derived by reproducing said marker recordings to a location sensing means such as a presettable counter which has previously been set by the selector means. In the operation of a system not employing a closed loop tape transport, when the tape reaches the desired frame, one of two control functions will occur depending on the direction in which the tape is being driven, viz:

If the tape is being driven in the same direction as it was driven during recording, the location sensing means transmits a signal, which is converted to a plurality of signals each of which is sent through respective delay lines which impart varying degrees of delay such that the playback or reproduction head for said recorded video signal transduces or reads only during the interval that the selected frame is opposite the playback head. If the tape is travelling in a direction opposite to the direction of travel during recording, the plurality of delayed signals will first stop the drive-motor driving said tape after the tape has been driven to a point beyond the selected frame. Said motor will then be caused to reverse and during the interval the selected frame is opposite the playback head, this head will be activated to record a video picture signal on the tape.

The selected information may be viewed on a visual display device of a monitoring means which may include a storage drum revolving at constant speed and having erasing, playback and recording heads associated therewith.

The erase head is first activated to clear old signals from the drum. Then video signals are transmitted from the playback head associated with the tape to the drum recording head which records the single frame video signal on the revolving drum. The signals recorded on the drum are reproduced by the drum playback head and transmitted to the visual display device which may be similar to a conventional home T.V. receiver. A Cathode ray tube of moderately low persistency may be used since said tube will be modulated by the same picture signal each time the drum makes a complete revolution.

The recording operation is similar to the playback operation in that the frame locating means or predetermining counter is first set by dial means or pushbuttons so that recording will take place on a selected section of tape. If the tape is driven in the improper direction for recording it will be driven passed the preselected location, stopped, and reversed. Then the erasing head will be activated to erase signals from the selected tape frame. Next, a first recording head and the video camera will be activated and, in a system that records its own marker signals, so will a second recording head. The first recording head records the single frame video signal while the second recording head records the sync signal at the end of the frame to serve as a marker for the succeeding frame. Next, the pick up head is activated so that the newly recorded video signal may be fed to the visual display means for monitoring.

Sequential switching of the video heads, tape drives, and camera circuits is preferably accomplished by means of a sync signal generated by the presettable or location sensing means counter. The sync signal is transmitted to a sequential switching means which splits or multiplies the sync signal into a plurality of signals each of which are given a predetermined degree of delay in accordance with the setting of the operational selector. The delayed signals are then used to condition bistable switches which in turn activate and deactivate the video heads, tape drives, and camera circuits in the proper sequence to achieve the selected mode of operation.

The video storage system just described will greatly simplify the production of animated cartoons in that a succession of frames may be recorded on the tape in tandem to produce the complete cartoon and, as each frame is recorded, it may be monitored with any changes in that frame being made before subsequent frames are recorded. The monitored frame immediately visually indicates such variables as changes in subject location, size, color, shape, etc. If necessary the recently recorded frame may be erased and the newly positioned characters are recorded on that frame.

Conventional cartoon film may be used in conjunction with the tape system by providing an optical system that will present identical images to a film camera and the video camera feeding the magnetic tape. First the image is recorded on the tape and monitored. When the positions of the characters have been altered to produce the desired image as viewed on the visual indicating device, the shutter of the film camera is activated to record the image on film.

Accordingly, a primary object of this invention is to provide an improved video storage system wherein documents and business records may be stored.

Another object is to provide a novel method for the production of recordings which when played back yield an animated sequence.

Another object is to provide a novel method of video storage wherein a single frame video signal is recorded on a predetermined location of an erasable storage means.

Another object is to provide a novel method of video storage wherein a single frame of information recorded on a selected location of an erasable storage means is viewed as it is recorded.

Still another object is to provide a novel means whereby cross indexing is accomplished to facilitate searching.

These and other objects of my invention will become more apparent after reading the following description of the accompanying drawings in which.

Figure 4:
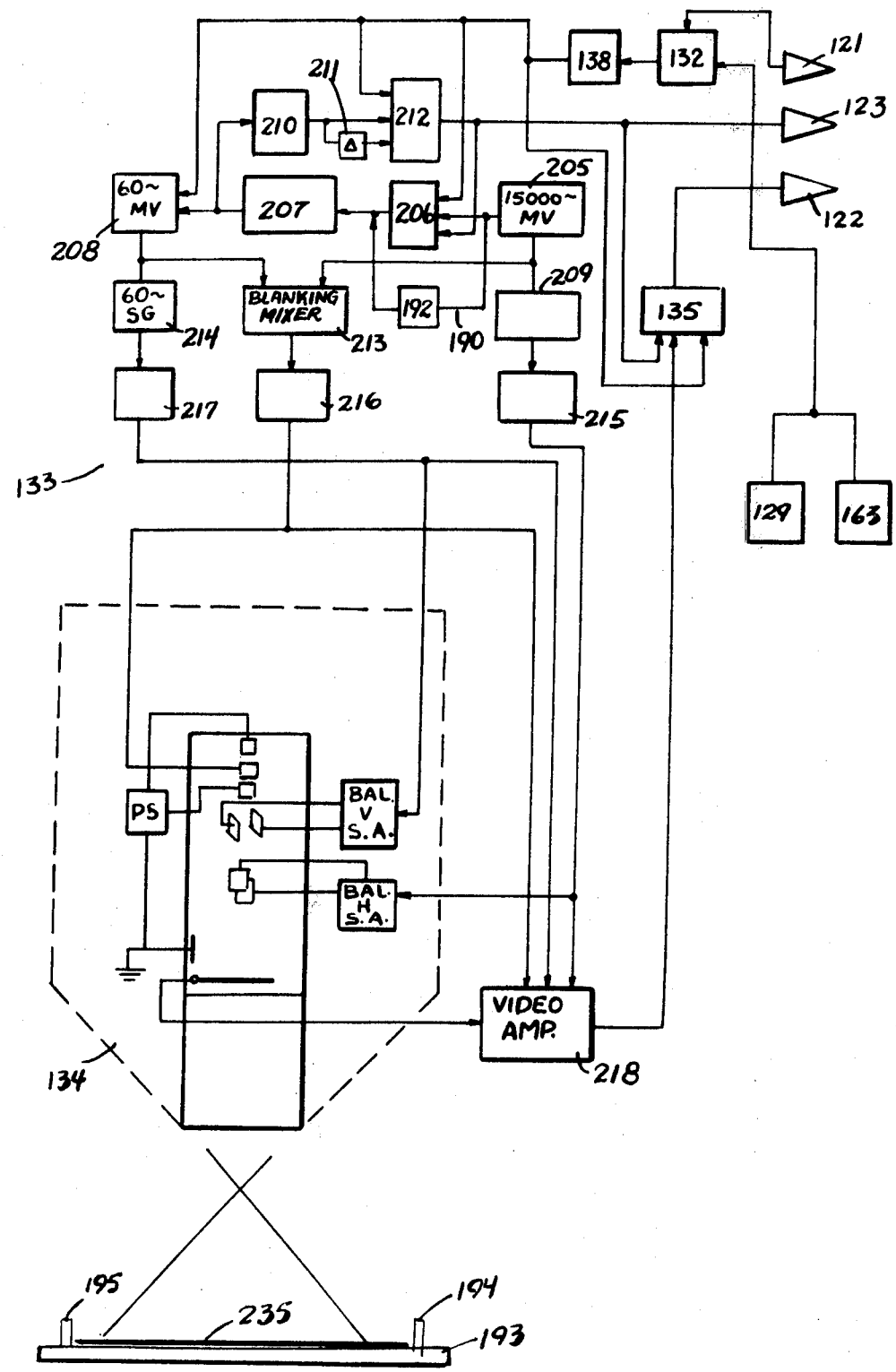
FIG. 4 is a schematic of another embodiment of this invention wherein recording on and playback from the magnetic tape occurs while the tape is in motion.
Figure 4A:
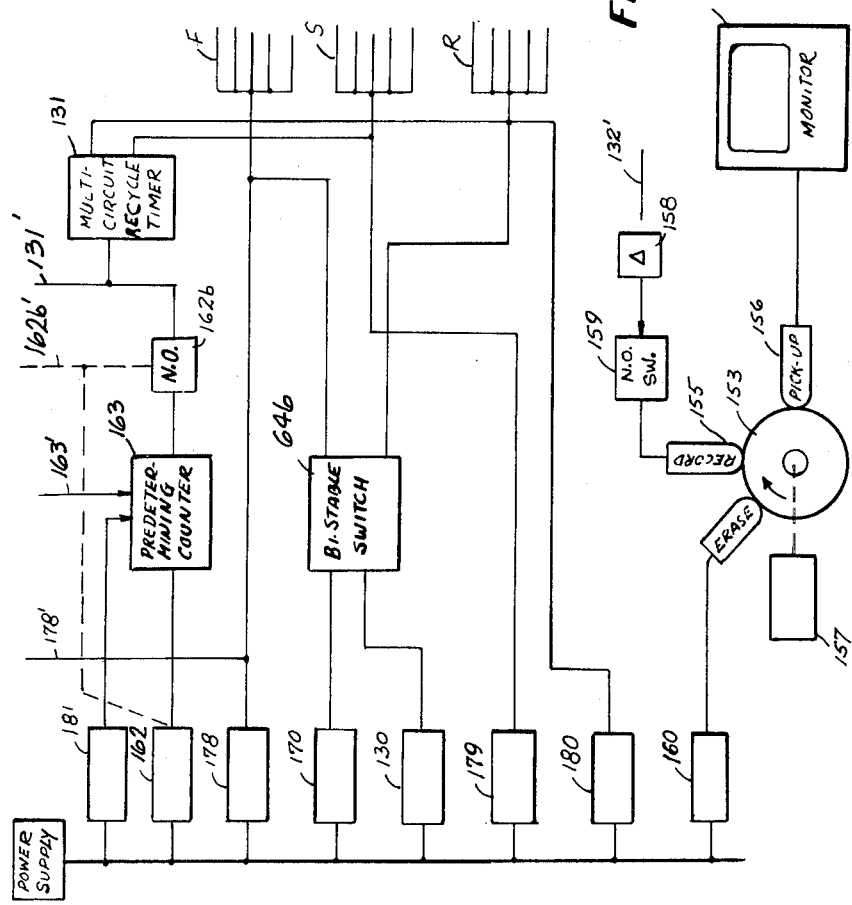
Figure 4B:
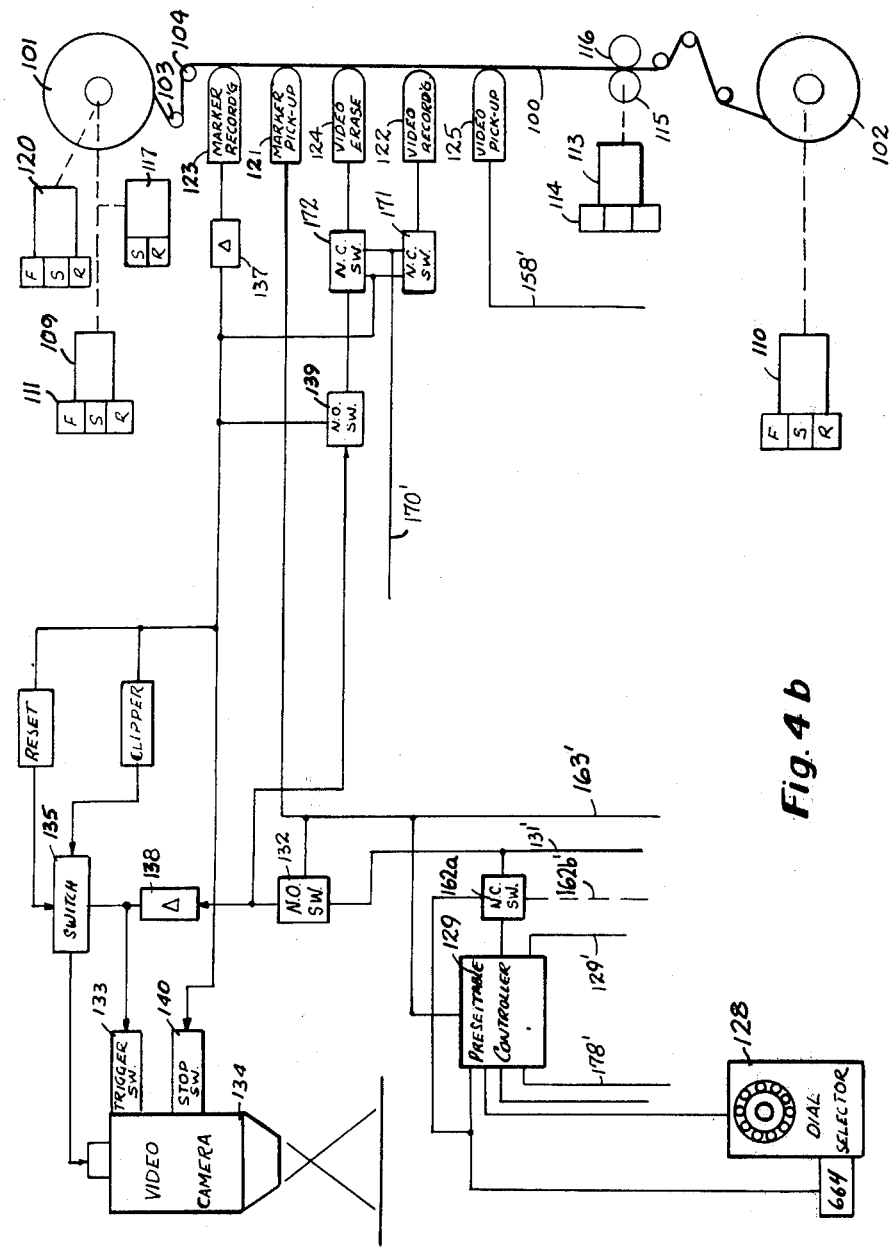

FIGS. 4a and 4b combined are the same as FIG. 4 with legends applied directly to the elements.

FIG. 4' is a schematic diagram showing means for deriving a single video frame signal by triggering the read beam of a video scanning camera.

Figure 5:
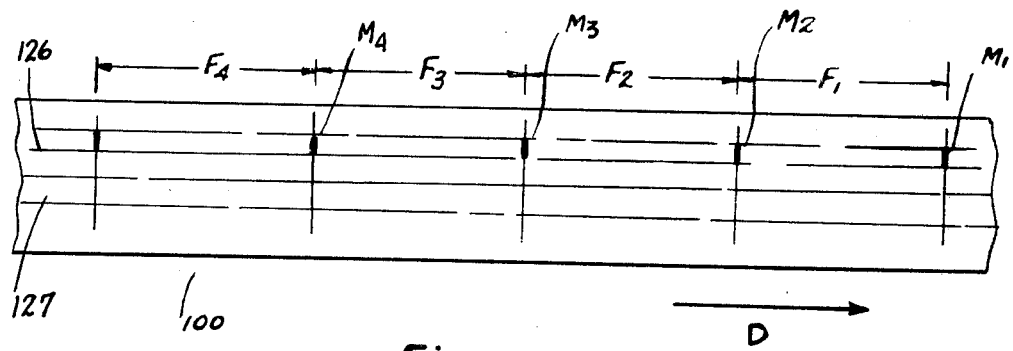

FIG. 5 is a section of the recording medium used in the embodiment of FIG. 4.

Figure 6:
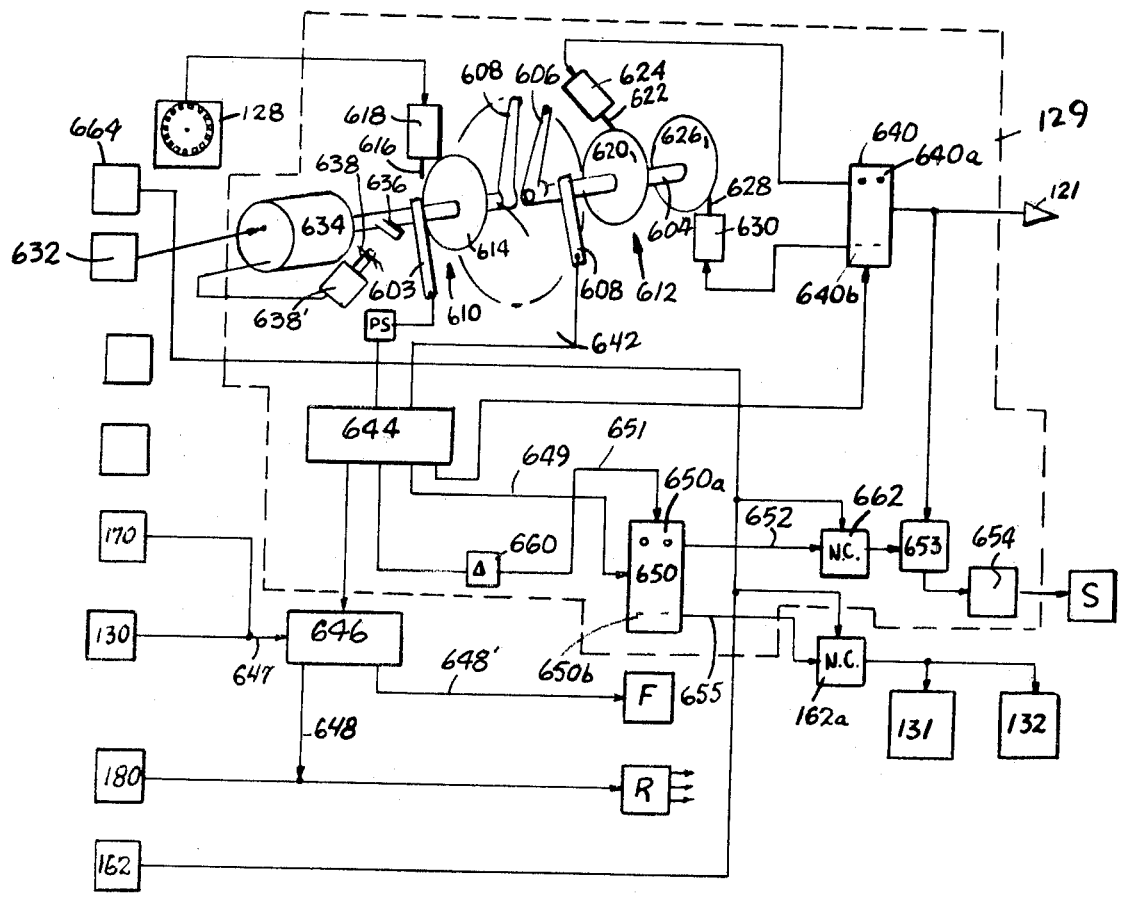

FIG. 6 is a schematic view of the pulse counting device used as the location sensing means of FIG. 4.

Figure 7:
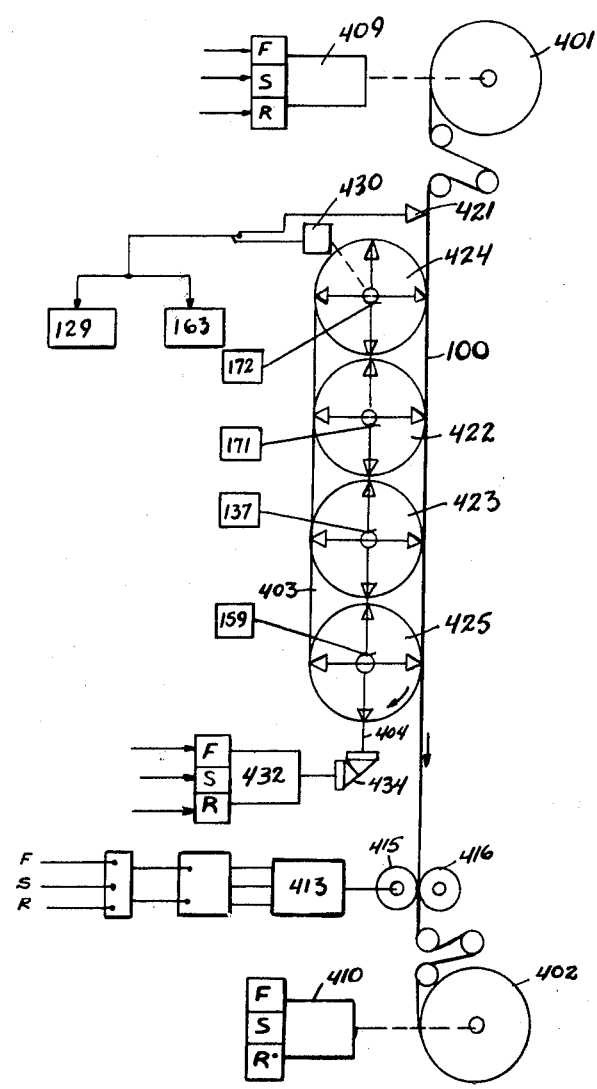

FIG. 7 is a schematic diagram of another embodiment employing movement of both the magnetic tape and magnetic transducing heads for recording thereon and playback therefrom at lower tape speeds.

Figure 1:
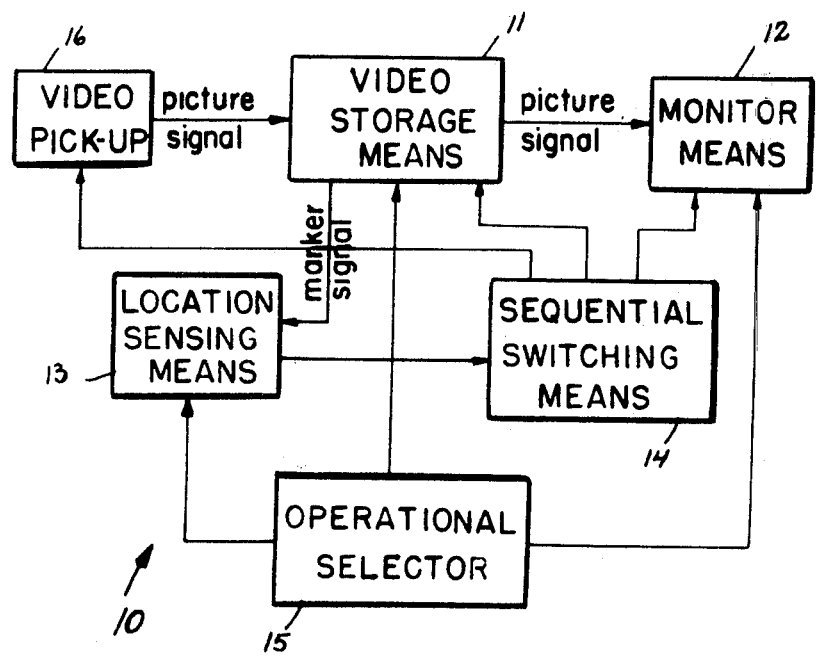
FIG. 1 is a block diagram of a video storage system for the recording and playback of single frame video signals.

Referring to the block diagram of FIG. 1, the video storage system 10 comprises an operational selector 15 for selecting the mode of operation of the system 10. Signals from operational selector 15 are fed to video storage means 11, monitor means 12 and location sensing means 13 to initiate system operation. Marker signals are transmitted from video storage means 11 to location sensing means 13 which generates a sync signal at the instant the marker signals correspond to a preset condition of the presettable locating means 13. The sync signal is fed to the sequential switching means 14 the multiple variable delay outputs of which are respectively transmitted to video pickup 16, video storage means 11, and monitor means 12 to control their sequence of operation.

Figure 3:
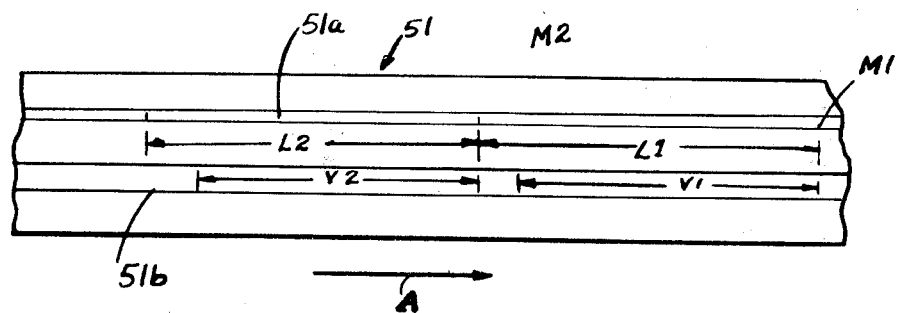
FIG. 3 is a section of the recording medium used in the embodiment of FIG. 2.
Figure 2:
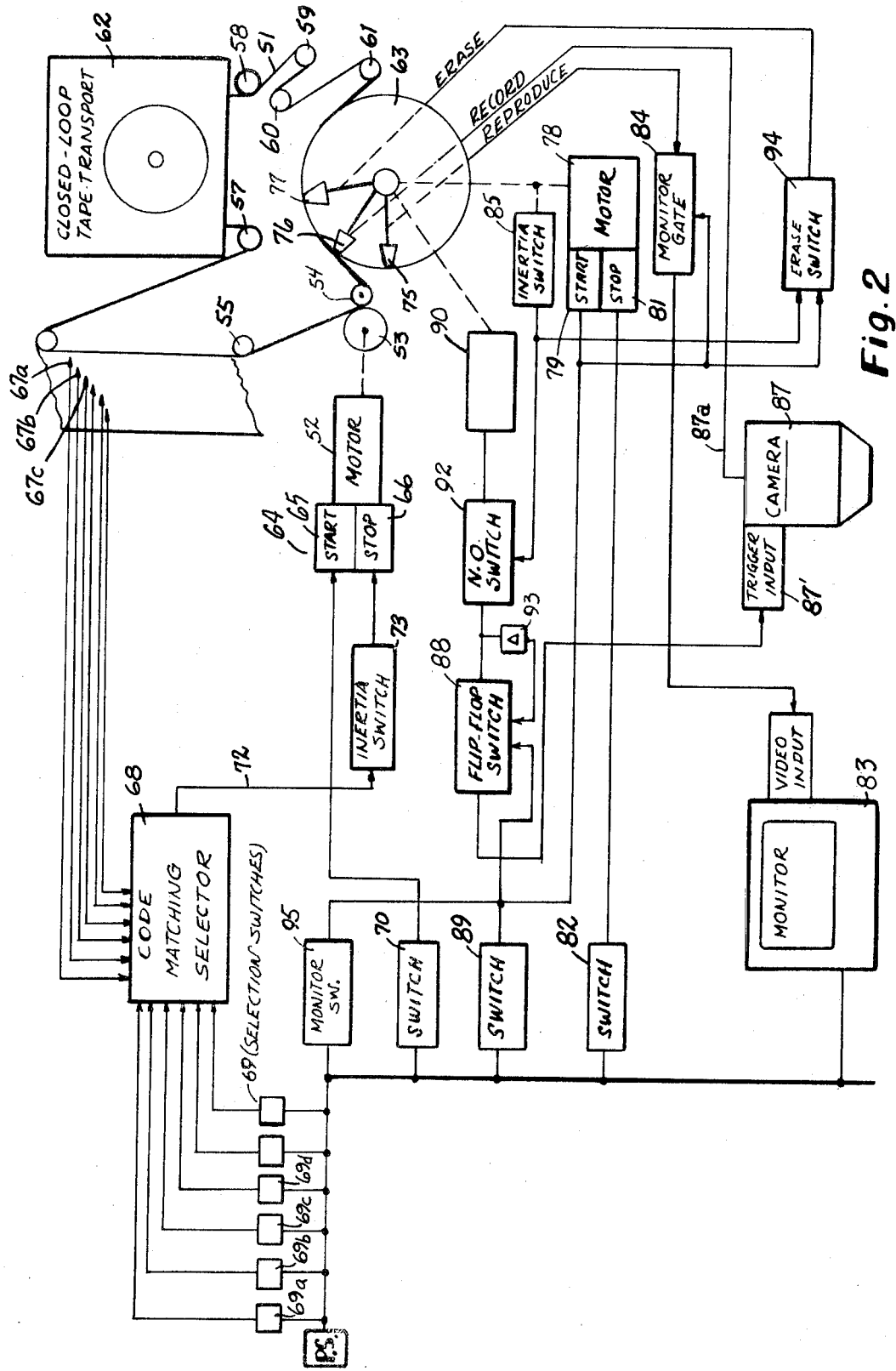
FIG. 2 is a schematic diagram of a first embodiment of this invention utilizing a closed loop tape transport and in which recording and playback is accomplished by stopping the tape and moving the video heads.

Referring to FIGS. 2 and 3, notation 50 refers generally to a closed loop transport system for the positioning of video storage medium or magnetic recording tape 51 which is driven in the direction indicated by arrow A. Tape 51 is driven by motor 52 through frictional engagement with capstan 53 and depressor roller 54 over a closed path defined by idlers 54–61, transport 62 and drum 63 constructed of non-magnetic material. Since the tape 51 travels through a closed loop the motor controller 64 need only have a forward start control 65 and a stop control 66.

As seen in FIG. 3 the tape 51 is arranged to have one or more longitudinal marker channels 51a and one or more video channels 51b extending parallel to the marker channels. Video signals V-1, V-2, etc., are recorded on tape lengths L-1, L-2 respectively which are arranged in tandem on tape 51. It is to be noted that video signals V-1, V-2 do not run the full lengths of L-1, L-2 respectively for a reason to be hereinafter fully explained. Associated with each length L-1, L-2 are markers M-1, M-2 respectively recorded on the one or more marker channels 51a which will identify a particular of the lengths L-1, L-2.

The marker or code signals recorded on marker channels 51a are read by marker pickup heads 67a, 67b, 67c, etc., which are positioned in the vicinity of idler 56. The signals received by marker pickup heads 67 are transmitted to a location sensing means which is a presettable code matching device 68 which has been conditioned by selectors 69a, 69b, 69c, etc. Presettable code matching device 68 may be of the digital type described in detail in my copending application 626,211 filed Dec. 4, 1956, or said code matching device 68 may comprise a device of the pulse counting type commonly known as a presettable, predetermining counter which will generate a control signal which a preset uncount condition has been reached in response to feedback signals generated in scanning the marker signal recordings on the tape.

Selectors 69 are set so that the tape length L having the desired video signal V recorded thereon, or on which length L a new information signal is to be recorded, will be positioned between depressor roll 54 and idler 61 with marker M being close to idler 61 when motor 52 is stopped. The operation which achieves this proceeds as follows:

1. Tape transport motor 52 is started by transport switch 70 which sends a signal through line 71 to the forward control 65 of motor controller 64.

2. As the tape 51 moves marker pickup heads 67 read marker signals M and transmit the resulting code to presettable code matching device 68 until such time as the code signal of marker M coincides with the code setting of selector 69.

3. At that instant the presettable code matching device 68 transmits a signal through line 72 to stop control 66, the power for transport motor 52 is automatically turned off.

4. But the tape 51, because of its inertia and the inertia of closed loop transport 50, will continue to move until the inertia energy is spent, at which time the desired length L will be positioned between depressor roll 54 and idler 61 to follow the curvature of drum 63.

It may be desirable to insert a normally open switch 73 in line 72 so that the signal transmitted from the presettable code matching device 68 will not reach stop control 66 unless motor 52 is up to speed thereby assuring a uniform coasting distance for tape 51. Switch 73 may be an inertia switch riding on the rotor of motor 52.

Drum 63 is freely mounted on shaft 74, having secured thereto video pickup head 75, video recording head 76, and erasing head 77 together with an associated slip ring (not shown) for each head with heads 75-77 being positioned within drum 63 and close to the surface thereof. Brushes (not shown) are in contact with the slip rings to convey signals to and from heads 75-77. Head motor 78, when energized through the forward control 79 of 80, will cause shaft 74 to rotate clockwise with respect to FIG. 2, or in the direction of arrow B, until such time as stop control 81 is manually actuated by stop switch 82 or automatically actuated by video camera 87 in a manner to hereinafter be fully explained.

Pickup head 75 reads video signals V on length L positioned over drum 63 and transmits reproduction of these signals to monitor means 83 through normally open monitor gate 84 which is closed by a signal from inertia switch 85 when head motor 78 is up to speed. Monitor means 83 may include a storage tube whose face, after being scanned once by a modulated "write-beam" will retain the image thereon for a number of minutes or until such time as the erase switch 86 is actuated. Many well-known storage tubes such as those described in the text "Storage Tubes" by Knoll and Kazan, may be used.

Video picture signal recording head 76 is energized by the picture signal output of video camera 87 which may be of the type used for conventional television transmission wherein the image field I is scanned twice for each frame to produce an interlace pattern, or the video camera 87 may be of a type that scans the image field I but once each frame. The video signals from camera 87 are also fed through a clipper and delay means 96, such as a pentode clipper adapted to pass only the frame vertical sync signal at the trailing edge of the frame composite video picture signal to actuate stop control 81.

Video camera 87 is controlled by a camera actuator 88 which is conditioned by signals originating from recording switch 89 and shaft position switch 90. Camera actuator 88 is a bistable switch of the type that will pass an input signal to one of two output circuits depending on the condition dictated by the last switching input and will continue to pass signals to this circuit until such time as a new condition is set up by other switching signals.

In the instant application, camera actuator 88 includes a first output circuit thereof feeding a signal through line 91 to trigger input 87' of video camera 87 while a second output circuit thereof is open.

Signals will pass through the first output circuit after recording switch 89 has been energized or actuated while the second output will be active after the camera actuator switch 88 has been conditioned by a signal from shaft position switch 90.

Shaft position switch 90 may be a micro-switch actuated by a pin or cam projection not shown on shaft 74, one time for each revolution of said shaft to indicate that the video recording head has just passed a predetermined point in its rotation and is opposite a predetermined point in the length of the tape between said guide rolls 54 and 61. When switch 90 is thus actuated, the signal output thereof, produced when said switch completes a circuit with a power supply, not shown, may be used to effect recording of the desired video frame signal on said predetermined length of tape 51 as follows. It is assumed that the normally open switch 92 has been closed by the inertial switch or mechanism 85 operating off the shaft of motor 78 when said motor is operating at a speed to rotate the recording transducers secured to drum 63 at the desired recording velocity. When this occurs, the output of 90 will be passed through switch 92 to two circuits, one directly to a first signal input of camera actuator switch 88 and the other which includes a delay line 93, through which said signal passes, to a second switching input of 88, which switches 88 after said other signal has passed therethrough to circuit 91 so that successive signals from 90 will not be passed to 91. The signal passed through 88 is transmitted to the trigger input 87' of camera scanner 87 and is used to initiate the scanning sweep of the video tube in the camera. The resulting video picture signal output, which may be a composite video picture having blanking plus sync signals combined therewith, is passed over cable 187a to the recording head 176 and to the clipper circuit 96.

Signals will pass through the first output circuit after recording switch 89 has been activated while the second output will be active after camera actuator switch 88 has been conditioned by a signal from shaft position switch 90.

Shaft position switch 90 may be a micro switch actuated by a protrusion (not shown) of shaft 74 once for each revolution of the shaft 74, to indicate that the video recording head has just passed depressor roll 54. Signals from shaft position switch 90 must pass through normally open switch 92 which is closed by inertia switch 85 after drum motor 78 is up to speed. After passing through switch 92 the signal from switch 90 first acts as the input signal to camera actuator switch 88. Passing through delay element 93 it acts as the switching signal to open camera actuator switch 88 so that there will be no output from camera 87 after one frame is complete.

When recording switch 89 is actuated, switch 88 will be conditioned to pass an input signal to video trigger input 87'. The next input signal to switch 88 will be the signal from shaft position switch 90 occurring after head motor 78 has reached operating speed since until this time switch 92 has been open. This signal is transmitted to video trigger input 87' which causes the scanning beam of 87 to scan image field I in less time than it takes video recording head 76 to travel tape length L. Before a second signal has passed through switch 92, the first signal has passed through delay element 93 to open actuator switch 88.

Viewing of the information recorded on a given tape length L may take place without simultaneously recording, by actuating monitor switch 95 which starts head motor 79 without conditioning camera actuator switch 88. It should now be apparent that the video signals V does not take up a full tape length L since the stopping of the tape by coasting is not the most precise positioning method. Furthermore, flyback time is required between video frames if they are to be played back in succession as a movie.

Erase head 77 is controlled by erase switch 94 which is only closed during the interval between the actuation of recording switch 89 and the time that the head drive-motor 78 reaches speed as evidenced by a signal from inertia switch 85. Since inertia switch 85 also controls video recording, video camera 87 cannot be activated until erase head 77 has been deactivated.

Pickup head 75 is positioned counterclockwise of recording head 76 so that video signals V are monitored substantially at the instant they are recorded, thereby overcoming a most objectionable feature of photographic recording. That is, in conventional photographic film storage devices there is a delay between the time that the information is recorded on the storage medium and the time that the information can be monitored or viewed. In addition, if an error has been made in the photograph or the information becomes obsolete this section of film cannot be reused whereas video recording on magnetic tape permits faulty recordings to be instantly erased without destroying the storage medium.

It is to be understood that, for the sake of clarity amplifiers associated with the various heads, 75-77 have been omitted. For the same reason, the illustration of power supplies has been omitted from the drawings and it is assumed that sufficient power means are provided on the correct side of all switches and controls.

Referring more particularly to FIGS. 4 and 5, a second embodiment of my invention is illustrated wherein the magnetic storage medium is in motion during the recording and playback operation. Magnetic recording medium or tape 100 is fed between take-up reels 101 and 102 and is guided therebetween by idlers 103-108. Reversible motors 109 and 110 drive reels 101 and 102 respectively and are controlled by motor controllers 111 and 112 which have three inputs for controlling and effecting forward, stop, and reverse movement of their respective motors. With the controllers 111, 112 in the forward condition tape 100 will move in the direction indicated by arrow D while in the reverse condition tape 100 will move in the opposite direction. Brakes 117, 118 provide dynamic braking means for reels 101, 102 respectively.

The actual driving of tape 100 is accomplished by constant speed motor 113 having motor controller 114 associated therewith. Capstan 115 connected to the output of motor 113 is in frictional engagement with one side of tape 100 while depressor wheel 116 on the opposite side of tape 100 provides a support for capstan 115. Constant power supply brake 120 senses the tension in tape 100 and maintains the same reasonably constant by regulating the speed of reel 101.

The tape drive system just described is typical of the art and is more particularly described in the R.D.A Review Vol. XVII, September 1956, No. 3, pages 365-373.

Frame indicating or marker pickup head 121 is longitudinally aligned along tape 100 adjacent to marker channel 126 of tape 100 arranged in tandem with frame indicating marker recording head 123. In a line parallel to heads 121, 123 are video recording head 122, erase head 124, and reproduction head 125 which are coupled to video channel 127.

Recording of a signal proceeds as follows when the tape 100 is being driven in the forward direction, which is the direction indicated by arrow D, and the tape frame F on which the recording is to take place is behind the tape frame opposite marker pickup head 121; that is, if marker pickup head 121 is at frame F$_3$ recording will take place on a higher numbered frame sufficiently far behind to permit the tape 100 to attain operating speed.

Dial selector 128, is placed at a setting corresponding to the frame F on which recording is to take place to set up presettable code matching device or pulse counting device 129, the detailed construction of which shall be hereinafter fully explained. Switch 130 is actuated to start rotation of tape drive motors 109, 110, 113 in the forward direction to drive tape 100 in the forward direction. Marker pickup head 121 reads marker pulses M and transmits each pulse to pulse counting device 129 which goes through an uncounting process until such time as a predetermined number of marker signals M pass marker pickup head 121. At this time, pulse counting device 129 will feed a control pulse to close switch 132 which is a normally open switch having an instantaneous closing and time delayed opening characteristic with the time delay interval being slightly less than the time it takes one tape frame F to pass a given point. However, normally open switch 132 will remain open for a sufficient interval of time to allow the pulse generated by marker pickup head 121 after the pulse that uncounted pulse counting device 129 attains its zero condition, to pass through delay device 138 to the start control 133 of video camera 134 to thereby cause the read beam thereof to scan image field 135. The signal passing through switch 132 will also pass undelayed to close normally opened switch 139 which controls erase head 124, which is positioned opposite marker pickup head 121. Switch 139 remains closed for the time it takes a tape frame length F to pass a given point when the tape is moving at operating speed. Delay device 138 compensates for the longitudinal distance between erase head 124 and video recording head 122.

The pulse passing to camera start control 133 also conditions switch 135 to pass video signals from video camera 134 to a clipper differentiator 136 and video recording head 122 which records the video signal on video channel 127 of tape 100. Bistable switch 135 alternately opens and closes as switching pulses are received from marker pickup head 121 and clipper differentiator 136. Clipper differentiator 136 clips the lower amplitude video signals and transforms the frame vertical sync signal at the end of a video frame to a discrete pulse which is used to close switch 135 and, in a system that records its own marker pulses on tape 100, also passes said clipper signal to marker recording head 123 through delay line 137 which delays the pulse for a length of time equal to the time interval between frames in conventional television transmission and the time it takes a point on the tape to travel the longitudinal distance between heads 122 and 123. The signal from clipper differentiator 136 also passes to stop switch 140 of video camera 134 and is effective to condition the read beam thereof, to begin the next scanning of the image field 135.

The zero or control pulse fed by the pulse counting device 129 to normally open switch 132 is also fed to a multi-circuit self resetting cycle time 131 which comprises a plurality of time delay elements (not shown) so arranged that after recording is effected on the selected frame, the tape drive motors 109, 110 are stopped and then reversed. The tape drive motors are stopped thereafter such that the tape is at a point a predetermined number of frames in advance of the frame on which recording has just taken place so that the tape will be able to accelerate to recording speed in the distance to the frame following the frame on which recording has just taken place. The final stopping operation is controlled by stop counter 654 operating in a manner to be hereinafter described.

Monitor means 150 comprises a viewing device 151, which may be a conventional video receiver, including a viewing tube or screen, and a rotating magnetic recording drum 153, having associated therewith, monitor erase head 154, monitor recording head 155, and monitor pickup head 156. The circumference of drum 153 is equal to or slightly larger than the distance required to record a single frame or video picture signal thereon at said video recording speed and the drum 153 is driven at a constant speed by synchronous motor 157 so that picture tube 152 may be of low persistence. Thus with each revolution of drum 153 the write beam of picture tube 152 will be modulated thereby and renew the single frame screen presentation.

Video pickup head 125 transmits video signals reproduced from tape 100 to monitor recording head 155 through normally open switch 159. The marker pulse passing switch 132 after passing through time delay element 158 closes switch 159. Switch 159, once closed, remains in this condition for the interval of time required for a tape frame length F to pass a fixed point. Delay element 158 provides a time delay interval to compensate for the longitudinal distance between marker pickup head 121 and video pickup head 125 so that part of the prior signal on 100 will not be passed to 155. Video signals recorded on rotating drum 153 are read by monitor pickup head 156 and transmitted to monitor viewing tube 151 on which an image is generated.

Push button switch 160, when closed, energizes monitor erase head 154 and is preferably actuated before actuating the start switch 130 which originates system operation.

When tape 100 is stopped a predetermined number of frames in advance of the frame F on which recording has just taken place as determined by the stop counter 654, recording on the following frame may occur in one of two ways. Switch 130 may be actuated with operation taking place by means of the control or zero signal transmitted by presettable pulse counter 129 or switch 162 may be actuated to effectively cut out or deactivate presettable pulse counter 129 and insert the cartoon counter 163 into the system.

Switch 162 is a normally open section of a triple pole double throw switch having another normally open section 162b in the output of cartoon counter 163 and a normally closed section 162a in the output of the presettable pulse counter 129. Sections 162, 162a, 162b remain in their other than normal positions for an interval slightly longer than the time required for cartoon counter 163 to uncount and transmit a zero signal which performs the same functions as the zero signal of presettable pulse counter 129 as heretofore explained. Cartoon counter 163 is a self recycling or resetting predetermining counter and relay which once activated by closing switch section 162, will generate a control signal after counting a predetermined number of pulses such that recording or reproduction will take place on the next frame F. Recordings may be thus effected on successive frames without resetting dial selector 128. Cartoon counter 163 is self resetting.

Reproduction from a selected frame proceeds by operating switch 160 to clear drum 153 of signals, setting dial selector 128, and then operating switch 170. This will send signals which open normally closed switches 171 and 172 thereby opening the circuits to video recording head 122 and erase head 124 respectively. The apparatus will operate as during the recording process but erase head 124 and video recording head 122 will not be activated. However, pickup head 125 will read information recorded on the selected frame and transmit it to monitoring means 150 where it may be viewed. Switches 171 and 172 will be returned to their normally closed position by the signal output of clipper differentiator 136.

Switches 178-180 are provided for manual operation of the motor controllers to their start, stop, and reverse positions respectively. If a new operation should be desired or the apparatus has been stopped before cartoon counter 163 has uncounted, said counter may be manually reset by switch 181. Similarly switch 182 serves as a manual reset for bistable switch 135 to return it to its normally open position. The bistable switches above referred to may comprise vacuum tube switching circuits typical of the computer art. However, the tape drive of the instant invention is reasonably slow so that latching relays will give satisfactory performance.

As noted in the introduction, my system will greatly simplify the production of animated cartoons. This is accomplished by operating the apparatus hereinbefore described in the following manner.

1. Provide a first image in the field of a video camera by arranging characters and background elements in a desired configuration,
2. Scan this image with the scanner forming part of the video camera to produce a recordable signal at a recording head,
3. Cause relative movement between the recording head and a first length of magnetizable recording tape with respect to the longitudinal axis of the tape at a rate of movement to be used during playback,
4. Record the signal on this length of tape,
5. Stop the relative movement,
6. Provide second and successive images in the field of the video camera as set forth in step 1 above to represent the appearance of the first image elements at later, discrete and discontinuous second and successive instants in time,
7. Reestablish the relative movement between tape and recording head and otherwise repeat steps 2 through 4 above for each image field established to record these images on adjacent tape lengths to yield a sequence of adjacent magnetically recorded and reproducible representation of these images on the tape, and
8. Play back from the tape so that an adjacent frames are reproduced at substantially equally spaced intervals of time to produce an animated sequence of visible images.

A recording on conventional photographic film may be made at the same time without the necessity of subsequent editing being all but eliminated. This is accomplished by taking single frame photographs on successive film lengths using the video monitor as the source of the image being photographed. Naturally photographs are taken only after a desired image is displayed on the monitor.

It should be apparent to those skilled in the art that the magnetic tape and associated head having longitudinal relative movement as hereinbefore described may readily be replaced by a magnetic tape and associated heads wherein a combination longitudinal and transverse relative movement is utilized. In the latter system, the information is recorded on a plurality of channels oblique to the longitudinal axis of the tape thereby achieving slower tape speeds. Such a system is utilized in the Ampex Video Tape Recorder described in the August, 1956 issue of Electronic Industries published by Chilton Co., Inc.

It is noted that the means of FIGS. 2 and 4 utilized for indicating tape frame positions by recording spaced apart pulses on a channel of the tape 1 other than that on which the video picture signal is recorded, may be replaced by signal means recorded on the same channel on which said video signals are recorded. Marker pulse signals may be provided at the beginning of each video picture signal or the frame vertical sync signal present in the composite video signal may be clipped therefrom and utilized for the purposes described.

FIG. 4' shows schematically details of the video camera scanning deflection circuit and the associated control and switching means for effecting scanning of the image field 135 and producing a composite video frame picture signal in a condition for recording.

FIG. 4' illustrates a deflection circuit for the video camera 134 of FIG. 4 and the associated switching means or camera actuator 133 of FIG. 4. The switching circuit or controller 133 may also be employed in FIG. 2 for the switching means referred to by the numerals 88 and 87'. The video camera 134 illustrated is a cathode ray device employing electrostatic deflection although any other type may be employed for the purpose.

The pulse passed through delay element 138 is passed over several circuits including the "switch closing" input of a first bistable electronic switch or gate 212, a "closing" switching input to a second bi-stable electronic switch 206, and a trigger input to a 60 cycle multi-vibrator 208 which heads the vertical deflection chain of the deflection circuit associated with the scanning beam of the camera 134. The pulse to the switch 206 closes said switch and completes a circuit between the output of a 15,000 cycle free running multi-vibrator 205 and the signal input to a counter 207. The pulse to 208 triggers and drives said multi-vibrator causing an immediate output therefrom to the conventional illustrated 60 cycle signal generator 214 and the blanking mixer 213 of the deflection circuit. The output of 214 is produced as the frame vertical sync signal and passed through the vertical sync amplifier 217 from which it passes to the camera beam deflection circuits illustrated, and is used to bring the scanning beam to its starting position in the scanning or image field defined by 235 after which said beam is controlled in a defined scanning sweep by the other deflection control circuits illustrated. The output of 217 is also passed to the video amplifier 218 to be combined therein with the picture signal resulting from the scanning and the horizontal sync and blanking signals to provide a composite video signal output. The camera and deflection circuits are conventional closed circuit television control circuits and are described in detail in the text "Elements of Television Systems" by George E. Anner published by Prentice Hall. In this reference, the counter 207 is a 250 to 1 pulse counter producing a pulse output at 60 cycles per second when connected to the 15000 cycle free running multi-vibrator.

Thus, one sixtieth of a second after the appearance of the selected frame marker-pulse reproduction at the output of 138, 218 produces an output which is passed to 108 to provide the next vertical sync pulse for returning the scanning beam to its starting position in the image field, and, for faster scanning, the second sweep of the image field starts whereby the picture signal output is continued to the video amplifier 218.

The output of 207 is also passed to a counter 210 which produces a pulse output upon receipt of at least two pulses from 207. The output of 138 is passed through the closed gate 212 and is used to open said gate 206 after passing therethrough to the "open" switching input to 206. Thus further signals from the 15000 cycle multi-vibrator 205 are prevented from passing to the counter so that it will remain in a reset condition for the next recording cycle. The pulse output of 207 is also passed through 212 to the marker pulse recording head 123 to indicate the position of the signal just recorded and for use, as described in recording the next video signal on 100. The output of 210 is passed through a delay line 211 to the "open" switching input of switch 212 thereby breaking the circuit between 210 and recording head 123. The output of 212 is also passed to the "open" switching input of the switch 135 in the output of the video amplifier 218 thereby preventing the passing of any signals therefrom to the picture signal recording head. For cartooning operations or the like, the counter 210 may be adjustable to produce an output signal after any number of predetermined inputs thereto from 207. This is provided in the event it is desired to maintain a still image in a motion picture recording for an extended period of time such as the image of a printed title or to create a condition of suspended animation. In order to view and evaluate or adjust the scanned field 235 on the image field of the monitor screen 152, a circuit 190 is provided which bypasses the switch 206 and connects the multi-vibrator 205 with the input to 207. A manual switch 192 is provided in the circuit 190 for opening and closing said circuit. It is assumed that the counter 210 is not only self-resetting after reaching its predetermined or preset count, but is also provided with automatic resetting means operated a time interval after the input to the counter stops so that regardless of the period of time the circuit 190 is completed, the counter 210 will automatically reset for the next recording operation.

FIG. 6 is a schematic diagram showing a positional controller which, in the control system of FIG. 4, will perform the functions of the control unit referred to by the notation 129. The controller 129, which is a positional computer capable of indicating by an output signal when a predetermined section or length of the tape is a predetermined distance from or opposite one of the transducing heads, operates by the relative rotation of two aligned shafts 602 and 604. The shaft 602 is stepped from a predetermined or zero angular position through a selected counterclockwise angular motion in movement comprising a selected number of unit angle increments, said angle being proportioned to the length of said tape which is moved past said heads from the first frame thereof to the frame on which said selected frame is located for transducing on or from. The shaft 604 is adapted to rotate, as the tape 100 moves, an angle defined from said zero angle which is proportional to the degree of motion of the tape 100 past the transducing heads.

Secured to the ends of each shaft are electronically conducting contactor arms 606 and 608 which are shaped such that a contacting element near the end of each will cross and contact each other when both shafts are rotated the same angle from said common zero or starting position. By providing drives 610 and 612 for each shaft, which will step the respective shafts intermittently through similar unit increments, and providing said contactors 606 and 608 as switching elements in a circuit 642 containing a power supply PS, said circuit will be completed to generate a signal utilizable for control purposes, when the contactors touch (i.e. the shafts are at the same angular positions). The crossing of the contactors 606 and 608 signifies that the tape section at or approaching the transducer heads 121' corresponds to that selected by a predetermined rotation of the shaft 602 from its zero position.

The shaft 602 is stepped counterclockwise in FIG. 6 by a mechanism 610 including a ratchet wheel 614 keyed to said shaft driven by a pawl 616 actuated by a solenoid 618. The shaft 602 is rotated counterclockwise and returned to zero by an electric motor 634 coupled directly thereto. The drive 612 for shaft 604 includes means for stepping said shaft in either the clockwise or counterclockwise directions. A ratchet wheel 620 stepped by a pawl 622 actuated by a solenoid 624 steps the shaft 604 clockwise. Ratchet wheel 626 driven by pawl 628 operated by solenoid 630, steps shaft 604 counterclockwise. The input to solenoid 618 is from a rotary dial switch 128 which transmits a selected number of pulses thereto depending on the selected position manually dialed thereby, and steps 602 said selected number of angular units from a starting or zero angular position. Resetting shaft 602 to zero is effected by manually closing switch 632 which pulses the starter of the servo motor 634 driving said shaft clockwise. The shaft 602 rotates until pin 636 projecting therefrom strikes a stop 638. The motor 634 is shut off by a pulse to its stop control from a limit switch 638" actuated when 636 engages 638.

As stated, the position of the shaft 604 at any instant is an indication of the frame of the tape 100 which is adjacent the transducing heads at the same instant. In other words, said shaft 604 moves an angular distance from said zero position, proportional to the number of recording frames moved by the tape from the first frame past said heads. Direction of rotation of shaft 604, clockwise or counterclockwise, is controlled by logical switching means adapted to effect its rotation clockwise in FIG. 6 when tape 100 is being driven in reverse from reel 102 to 101, and counterclockwise when 100 travels in the forward direction from 101 to 102. Said shaft rotation is interlocked to the direction of motion of the tape 100 by use of a bi-stable switch 640 having one signal input from the reproduction transducer 121 which is gated thru 640 to either the solenoid 624 or 630 and a switching input from a circuit 646 to be described. The method of switching 640 may be described by noting the function of a circuit 642 which includes the contactors 606 and 608. The shafts 602 and 604 are electrical conductors and are insulated from each other. Electrical brush contactors 602 and 605 ride on shafts 602 and 604 and provide the contactors 616 and 618 in a series circuit with a power supply PS and a pulse transformer 644. Thus when the contactors 606 and 608 touch each other, the transformer 644 produces simultaneous output signals over the multiple illustrated circuits extending therefrom. An output of 644 extends to the switching inputs of bistable switches 640 and 650. The latter passes a reproduction of the same input to 644 after it has been delayed in delay relay 660 to one of two circuits 652 or 655 and switch 640 is switched thereby to pass the output of frame-pulse reproduction head 121 to one of the two solenoids 624 and 630. An output of 644 is also passed to the switching input of bistable switch 646 which switches an input circuit 647, which is connected to both of the manual control switches 130 and 170, to one of two output circuits 648 and 648' depending on whether the pulse last received by the switching input to 646 is an odd or even pulse (i.e. a function of the relative position of the contactors 606 and 608 prior to closing said circuit which in turn is a function of the relative position of the tape and transducing heads).

The circuit 129 is essentially a positional computer and controller of the motion of the tape, and the condition of the bistable switches 640, 646 and 650 is an indication of whether the selected frame of tape from or to which transducing is required, is on reel 101 or 102. The condition of switch 646 for example, determines whether the tape will be driven forward or in reverse when the controls 130 or 170 are energized. An example will first be given describing the control action occuring to effect tape motion, camera and transducer gating to transduce on and/or from a selected frame when said frame is located on reel 102 ahead of the transdicers. For this situation, it will be necessary to automatically drive the tape in reverse a distance such that, when stopped by the action of said controller 129 and 131, said tape will be in a position for transducing on or from the selected frame by the operation thereafter of the single frame transducing controller 163. When the selected frame is ahead of the heads 121', switch 646 is conditioned such that its signal input 647 from manually operated switches 130 and 170 is connected through circuit 648 to the reverse drive inputs R of the tape transport mechanism. Thus, if said selected frame is ahead of said transducing heads somewhere on reel 102, actuation of either switch 170 or 130 will cause the tape transport to drive the tape in reverse so that the selected frame will approach said heads. When the selected frame is on reel 102, switch 640 is in the switching condition 640a whereby the output of 121 will energize 634 and step shaft 604 clockwise to cause 606 to approach 608. Bistable switch 650 is in a condition 650b such than when 644 is next energized as the contactors of arms 606 and 608 cross, it, 650, will swtich to its other condition 650a so that an output from 644 will be passed therethrough over a circuit 652. A reproduction of the same pulse which caused an output from 644 and switched 650 to 650a as 606 and 608 crossed, is passed through 650 after the latter has switched to 650a by the provision of delay relay 660 in the output circuit 651 and 644 and is used to energize control apparatus to effect stoppage of the tape with the selected frame a predetermined distance behind the heads 121', on reel 101, so that energization thereafter of the single frame or cartooning selector switch 162 and the sequential controller 163 will result in transducing from and/or to said selected frame. Said apparatus for automatically effecting stoppage of the selected frame of said tape a predetermined distance or number of frames beyond or behind said heads comprises a predeterming counter 654 and a normally open switch 653 having a switching input from 650, a signal input from the reproduction transducer 121 and a signal output from 121 extending to counter 654. The counter 654 is a self-resetting predetermining counter-relay adapted, upon the receipt of a predetermined number of frame indicating pulses from 121 transmitted thereto after the selected frame has crossed the transducing heads after 606 and 608 have crossed, to transmit an energizing signal to the tape transport motor stop inputs or stop control S. The count setting of 654 is similar to that in the predetermining counter of the single frame controller 163 and is of a sufficient counter magnitude to stop the selected frame a sufficient distance behind the transducing heads to permit said tape to accelerate to the required video recording speed and to attain a constant recording velocity prior to the arrival of said selected frame at said transducing heads when selector 162 is energized. The normally open switch 653 is provided with a built-in delayed opening circuit or dashpot mechanism adapted to automatically open said switch a delayed period after closing sufficient to permit the counter 654 to receive its predetermined pulse count from 121 so that subsequent reproduction from the tape will not affect 654. The notation 662 refers to a normally closed switch which is opened when the panel switch 664 is closed during the operation of dial selector 128 to prevent the energizing of 653 should the contactors of 606 and 608 cross during the setting up of the frame selection computer 121. When switch 664 is closed, it simultaneously opens normally closed switch 162a preventing the passage of any signal to 131.

In the situation where the selected frame is a sufficient number of frames behind the transducing heads on reel 101 to permit acceleration of the tape to the required constant video recording speed by the time said selected frame passes said transducing heads, 608 is counterclockwise of 646, 640 has been conditioned from the prior pulse from 644 to switch to condition 640b so that the output of 121 is passed to 630 and used to step 606 counterclockwise towards 608; 650 is in condition 650b so that the output of 644 will be passed to 131 and 132 over circuit 655. The switch 646 is in a condition whereby the starting pulse from circuit 647 will be passed over circuit 648' to the forward drive control F of the tape transport. When contactors 606 and 608 cross, as the beginning of the selected frame approaches the transducing heads and the marker pulse for the selected frame is near the reproduction head 121, the pulse transformer 644 becomes energized and transmits pulses to said various switches including said selection transducing pulse through switch 650 to 131 and 132 to effect the described action or actions depending on whether one or both the switches 130 and 170 were initially energized.

FIG. 7 is a schematic diagram showing details of video recording and reproducing apparatus similar to that illustrated in FIG. 4 and applicable with minor modifications to the control means thereof, which utilizes transducing apparatus comprising means for moving both a magnetic tape and the transducing heads, the latter movement being lateral to or across said tape when transducing thereof or therefrom. Reference is made to the Ampex Video Tape recorder, described in the August, 1956 issue of Electronic Industries for details of such type of magnetic recording apparatus which comprises in part a rotatable drum 403, on which arrays of magnetic transducers are provided which rotate therewith and terminate at or near the surface of said drum 403 over which the tape 400 is driven in a path essentially parallel to the axis of rotation of said drum so that said transducers sweep paths which are parallel to each other and oblique to the edges of said tape.

Operation is accomplished by utilizing a relatively wide tape for 400 and providing means for holding said tape against the surface of the drum so that the width of said tape covers 90 to 120 degrees of rotation of the drum. By mounting three or four common recording and/or reproducing transducer heads at 90 or 120 degrees apart on the drum in the same plane normal to the axis of rotation, so that each sweeps the same circular path, and connecting all heads to a common input or output circuit by means of commutators and brushes operatively connected to said drum, the end of a signal recorded by one head on an oblique band area of the tape 400 will be continued at or near the beginning of the next parallel recording area swept by the next head, in said group, to sweep across said moving tape. With this type of apparatus, the tape may be driven at a much slower speed than that of FIG. 4 as the rotation of the transducers mounted on the drum contributes to the relative recording speed.

In FIG. 7 five transducing head groups are shown for the purposes of illustrating the transducing functions and include a group 421 for reproducing the so-called frame marker pulse; 422 for recording said frame marker pulses; 424 for recording said video signal; 425 for reproducing said video signal and 423 for erasing any signal thereopposite when energized or powered. Said five groups may be replaced by one or two groups of heads, if said heads are each adapted to perform the multiple functions of record, reproduce and erase signals depending on which of said transducing means is energized.

A single group of heads adapted to perform all three transducing functions will suffice if a limit switch 430 actuated by a protrusion or cam section of the shaft 404 on the drum 403 each time said drum rotates, is utilized to indicate frame position. The limit switch 430 is adapted to transmit a pulse each time a specific multiple head in the rotary group approaches during its rotation, the border of the tape 400. The pulse is transmitted to either or both the controllers 129 and 163 in accordance with FIG. 4 whereby said switch 430 replaces said marker pulse reproduction head 121 and elminates the necessity of recording frame marker pulses through 123. When utilizing 430, each separately recorded video signal will be recorded at or near the beginning of an oblique recording area near the edge of the tape or a predetermined distance from said edge and each will extend along the same number of said oblique areas. Thus frame selection will be a matter of presetting the positional computer 129 to transmit a control pulse over its output upon the receipt at its input of the number of pulses from 430 indicative of the specific longitudinal motion of the tape 400 to reach the selected frame.

The rest of the control circuitry is assumed to be similar to that illustrated in FIG. 4. The motors and controls 409, 410 and 413, correspond to motor driving means similar to respective drives 209, 210, and 213 of FIG. 4, which are modified to effect the necessary constant speed operation. A constant speed motor 432 is provided, and is controlled to start and stop by the controls F and S illustrated in FIG. 4, to drive the shaft 404 of drum 403 through gears 434 one of which is secured to the shaft 433 of 432. The tape 400 is started and stopped, reversed and automatically controlled as in FIG. 4.

Figure 8:
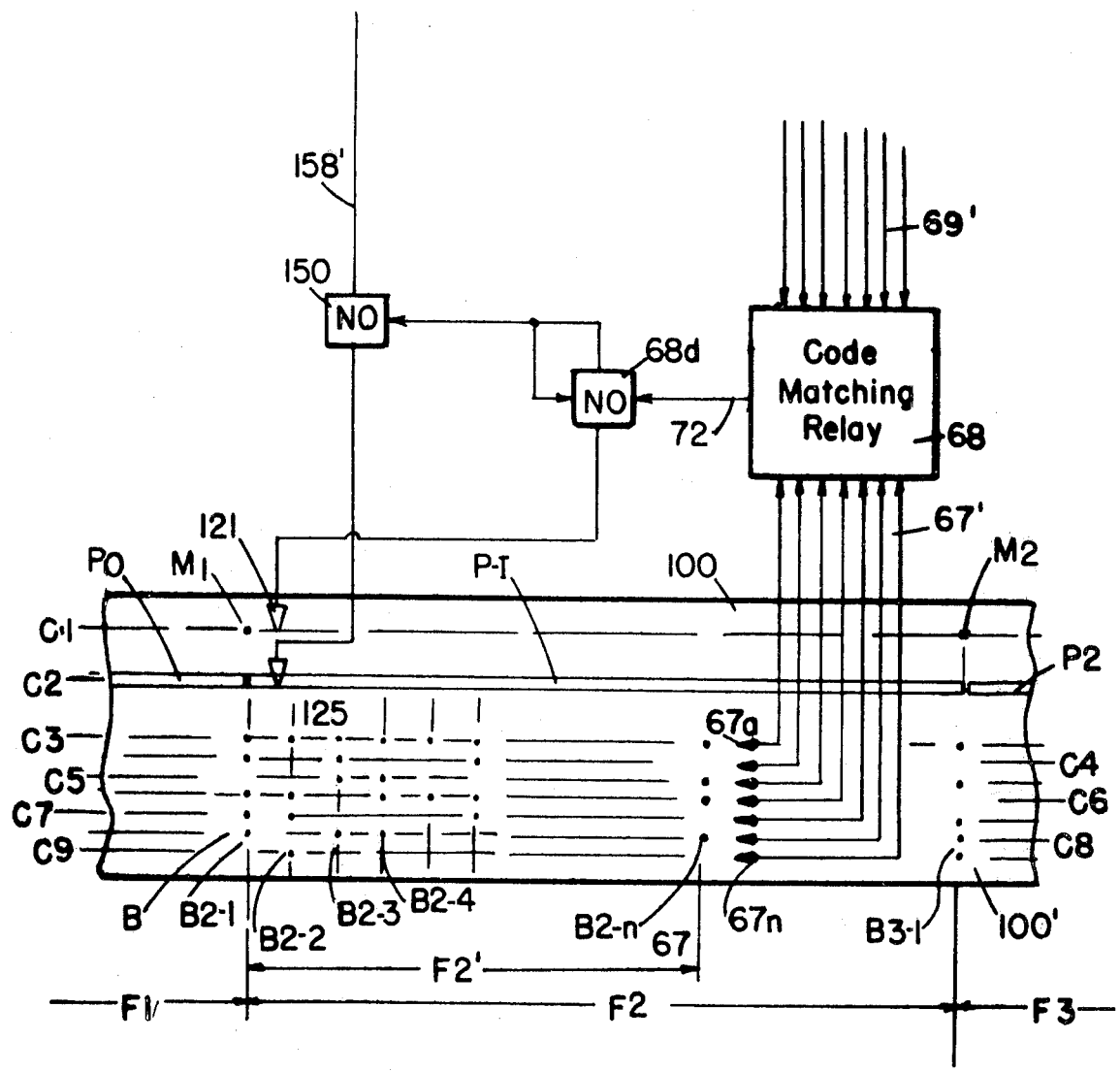

FIG. 8 shows a recording arrangement in the realm of this invention in which a recording area 100' is provided on the magnetic recording member 100 on which may be recorded a plurality of frame identifying codes with sufficient longitudinal recording area provided for recording a plurality of said codes which are related to a particular recorded video picture signal. In other words, there is sufficient recording area for recording a number of codes for each recorded picture signal so that cross referencing may be effected or different codes may be provided each relating to different subject matter contained in the same picture signal, each of which codes may be operative to effect the reproduction of the same picture signal.

Recorded on a first channel C1 of recording member 100 are marker signals M1, M2 ..... Mn for positionally indicating the leading edge or start of each picture signal. The plural picture signals P1, P2 ..... Pn are shown recorded in tandem array and occupying respective frame lengths or portions of the recording member 100 referred to by the notations F1, F2 ...... Fn. The picture signals may also be recorded oblique to the longitudinal axis of the recording member 100 by apparatus such as provided in FIGS. 2 and 7.

Parallel bit codes B are shown recorded on the parallel code tracks C3, C4 ...... Cn and are reproducible by magnetic reproduction heads PU3 ..... PUn. These code reproduction heads are so spaced in the relation to the picture signal reproduction head 125 that the last parallel code BN-n in the series provided for each frame will be reproduced before reproduction of the associated picture signal so that any of the codes may be used to effect gating of its associated picture signal to a monitor recorder or storage tube, regardless of the position of the code.

Figure 9:
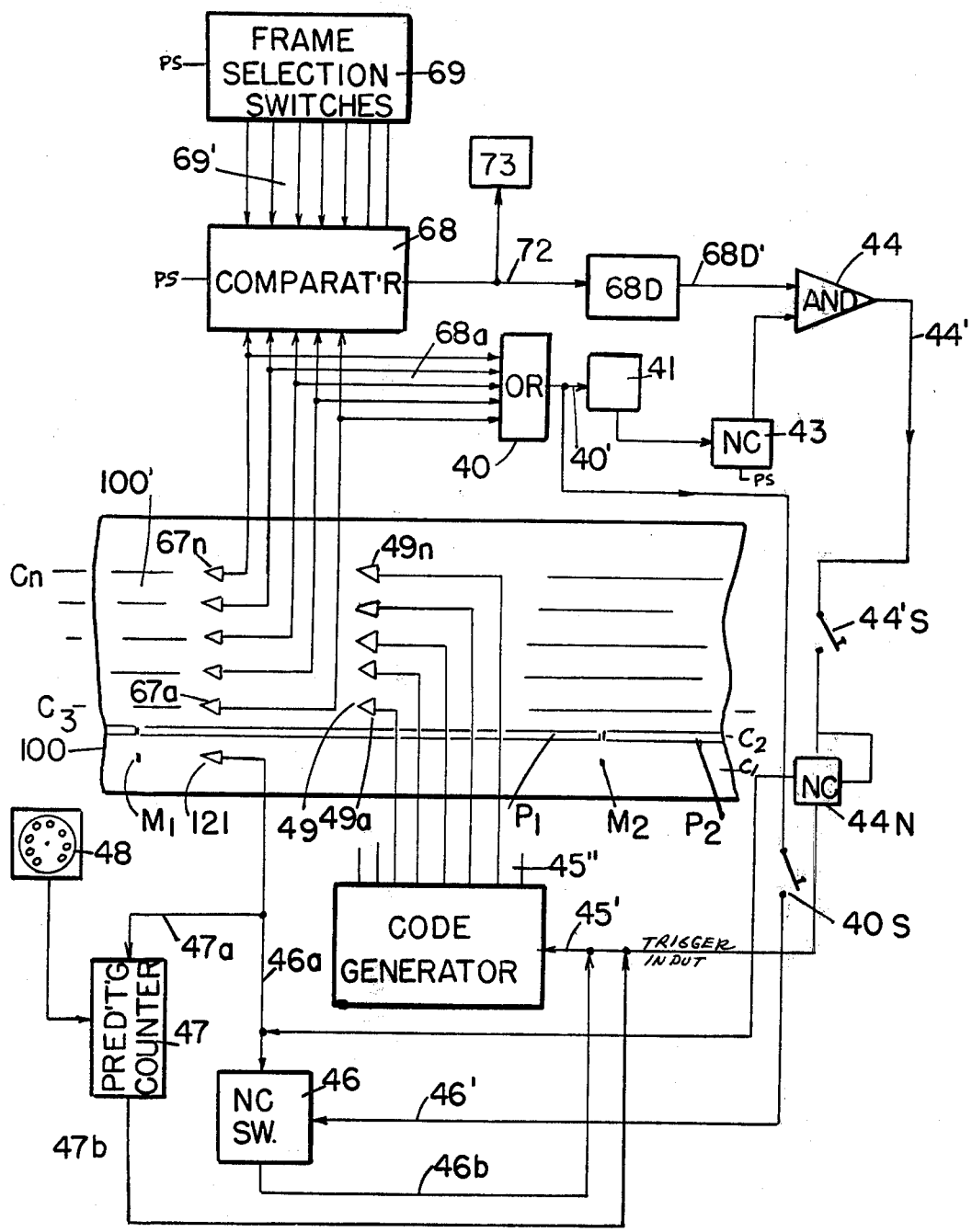

FIG. 9 illustrates means for automatically effecting the recording of frame identifying codes as well as cross-reference codes on the code recording channels or border area 100' of an erasable recording member such as the hereinabove described magnetic recording tape, or other suitable recording member such as a magnetic recording disc or drum, thermoplastic (TPR) recording member or other suitable recording member capable of having transduced thereon visible or sensitized spot or pulse recordings.

The apparatus provided in FIG. 9 may be operated to permit three types of recording functions, namely (a) recording of parallel codes such as binary codes for identifying each frame such as the codes B2-1, B3-1, etc. shown in FIG. 8 as both identifying the frames associated with each as well as indicating the starting location of each frame. These so called frame codes are recorded in consecutive order; (b) recording a cross-reference code associated with a particular frame on the next recording-free lateral area of the code recording area pertaining to or associated with said frame; (c) recording a particular frame code relative to a predetermined picture signal recording or predetermined length of the recording member, the location of which is known to the operator of the apparatus.

Considering the recording functions in the order presented above, a bank 67 of code sensing relays or transducers, 67a to 67n, is positioned with respective transducers adapted to read or sense code recordings on respective of the recording channels C3 to Cn which extend longitudinally along the code recording area 100' of the recording member 100. These transducers may comprise photo-multiplier tubes with respective optical scanning means if the member 100 comprises recording films such as thermoplastic TPR, recording material or Kalvar recording film, or said transducers may be conventional magnetic reproduction heads provided as a bank with each adapted to transduce from a respective of the channels C3 to Cn. The pick-ups of bank 67 are each connected to a respective input to a code matching relay 68, the other inputs 69' of which are energized in the desired coding array by means of a plurality of open and closed switches provided in the switching bank 69 as described. When the code appearing at the pickups 67 matches the code generated on the inputs 69', the code matching relay 68 will generate a signal on its output line 72, as hereinabove described which may be used to effect code recording control or to initiate an action resulting in said control. This signal is passed to energize a time delay relay 68D or limited TIME function which generates a signal on its output 68D' for a time interval approximately equal to either that during which the entire associated video picture signal will pass its reproduction or scanning transducer or that in which that length of the recording area 100' allocated to receive code signals associated with a particular frame will pass a given point. The output of 68D is passed to one input of a logical AND switching circuit 44 having a second input from a normally closed switch 43 or NOT circuit.

The output 44' of AND circuit extends to a code generator 45, which, when 44' is energized, generates a parallel binary code on various recording circuits for recording onto channels C3 to Cn.

The functions of the circuits or control elements disposed between the comparator device 68 and the AND circuit 44, which generates an output when both its inputs are energized, will best be described by analyzing the condition to be met when it is desired to energize or trigger the code generator 45. Each frame F of the recording member 100 may have recorded on its code area 100' a single code such as B2-1 of FIG. 8, which identifies the associated picture signal and is preferably the first code reproduced with said picture signal. The code recording area 100' of each frame may also have recorded thereon any number of additional codes such as B2-2, B2-3, B2-4, etc. depending on how many cross reference codes or the like have been previously recorded. These codes may extend as individual pulses recorded longitudinally along the various channels as discrete bit recordings or areas void of bit recordings. Since in this recording function it is desired to record the new cross reference code at the end of the last code recorded laterally along the first lateral code recording length of 100' which does not already contain a code, the presence of all previous recorded codes may be used to affect control of the new code recording.

The parallel outputs 67' of the code pick-ups 67a to 67n are also connected to a logical OR circuit 40, the output 40' of which will be energized whenever any one of its inputs 68a, which extend from the outputs 67' of code reproduction head bank 67, is energized. Thus, as long as codes are scanned by the transducers of 67, OR circuit 40 will generate pulses on its output. The output 40' of 40 extends to the switching input of a limited TIME function 41 which may be an electron tube or solid state switching circuit adapted to generate an output signal when its input 40' is energized for the time interval between reproduction of successive parallel codes so that as long as codes are being reproduced following the reproduction of the initial code, the output 42 of 41 which may be a power gating normally open, slow-to-open after closing switch, will have a signal generated thereon. The signal generated on line 42 may be used to retain a normally closed switch 43 open by energizing the latter's input which prevents a signal from a power supply PS passing to the second switching point input of AND circuit 44.

When the code pick-ups of bank 67 have scanned the last code provided on the selected frame, circuit 40' is deenergized, 41 fails to generate an output signal or opens and normally closed switch 43 closes energizing the output 43' thereof. Since 68D is generating a signal for at least the time interval necessary for the entire code recording portion of 100' to pass the code recording heads 49, AND circuit 44 becomes activated and a signal is generated on its output 44' which is transmitted to the input 45' of a code generator 45 a code generating device 45 having respective outputs connected to the recording transducers 40a to 40n which is automatically operative to record a predetermined code on the recording free area of 100'.

The latter device 45 may comprise a plurality of bi-stable switches which are activated in the desired code array by manual actuation, punched card or other means which connect a power supply with respective normally open switches which are simultaneously pulsed to close by the signal from 68D generated on line 45' for effecting recording of short pulses or code marks by pulsing those output of lines 45" of 45 for a short duration. A normally closed switch 44N is provided in the output line 44' of 44 which is operative upon the receipt of the signal from 68D passed through 44 to remain closed for only a short time duration and to open thereafter and remain open until a switching input thereto is energized by the next pulse generated by pick-up head 121 in scanning the next marker pulse such as M2. Notation 44'S refers to a manually operative switch in the output line 44' of 44 which may be opened by the operator of the apparatus when it is desired to effect other types of code recording which will be described.

If it is desired to record any binary code to identify a picture signal following that which is the last picture signal in a tandem array of said signals having a frame identifying parallel code recorded on the area 100', switch 44'S is opened and a second switch 42S is closed whereby the output of the OR circuit 42 is passed to the switching input of a normally closed switch 46 having a signal input 46a from the described marker pick-up head 121. Thus no signals will pass through switch 46 until no signals appear on the switching input 46' thereto which is indicative that no code signals are being reproduced by the bank 67 of reproduction transducers. Switch 46 which is slow to close after opening a degree such that as long as frame indicating signals appear at the pick-up transducers 67, the switch 46 will remain open. When said switch 46 closes the frame indicating pulse or mark for the next frame thereafter generates when scanned by 121 a signal on line 46a which passes through 46 to the input 45' of the code generating device 45 so that the code recorded or pre-set therein is next read or generated on the output line 45" and recorded through the recording transducers 40a to 40n. It is of course assumed that the bank of transducers 40 is immediately adjacent the pick-up transducers 67 or comprises the same transducers as 67 with the connections 45" made to effect, when energized, pulse recordings.

If it is desired to effect the recording of a parallel code programmed or pre-set in the code generating device 45 along any predetermined lateral area of the code recording area 100' of 100, a predetermining counter 47 is provided which may be pre-set by manual or other means such as a rotary dial switch 48 generating a predetermined number of pulses on the pre-setting input 48' to 47. Feedback signals are generated by marker pickup head 121 and transmitted to the feedback input 47a to 47. When the feedback signals are equal in number to the signals generated by 48 and used to preset 47, a pulse is generated on the output 47b of 47 which is transmitted to the input 45' to code generator 45 which effects readout of the code programmed therein on the output lines 45" feeding the recording heads 40.

By means of the apparatus illustrated in FIG. 9, parallel codes extending laterally across the recording member may be generated on the next free or unrecorded lateral space of a particular frame, in a tandem order or on any predetermined or selected frame or lateral recording area of the tape.

The parallel outputs of code pick-up heads PU-3 to PU-n are passed to code a matching relay 68, as described, having parallel inputs 67' from a code generating selection means such as selection switches 69 of FIG. 2. If one or more of the reproduced recorded parallel bit codes associated with a particular frame are operative to energize the code matching relay 68, a relay 68D is provided in the output 72 of 68 which is operative to pass the next marker signal reproduced by pick-up 121 to energize normally open switch 150 to close and pass the associated composite video picture signal on the output 158' to the monitor recorder or storage tube. The relay 68D may comprise the combination of a bi-stable switch. The input to the 68D from comparator relay 68, when energized, is operative to close a switch in the output of marker signal pick-up 121 and the switching input to video picture signal gate 150. The bi-stable switch in 68D is opened when the marker signal passed therethrough, is passed to the other switching input of said 68D as well as to 150. Thus matching of any code on recording area 100' will effect reproduction and gating of the associated picture signal through output control gate 150.

The apparatus illustrated in FIG. 9 may have certain modifications made thereto to provide either the same mode of operation or variations therein. For example, it is noted that the code matching relay 68 utilized in FIG. 9 for effecting the recording of a further code, such as a cross reference code, relative to a predetermined frame of video information, may also be utilized to effect the hereinabove described functions of selectively reproducing a particular frame or frames of video information. The output 72 of comparator 68 may also be connected as illustrated in FIG. 2 for effecting either the selective recording of a video picture signal along a predetermined segment of the recording member 100 or the selective reproduction of a predetermined picture signal therefrom. Thus a single code matching relay such as 68 may be used to perform one or more of the plural functions of recording or reproducing picture signals or frame identifying codes depending on which of the illustrated control switches are activated.

The code matching relay 68 may be replaced by a presettable predetermining counting means such as 47 receiving feedback signals such as those reproduced in scanning marker signals M as well as a plurality of closely spaced marker signals between said frame marker signals. However, the code matching relay is no applicable where random cross referencing is desired.

It is also noted that if the recording member 100 is of the electro-optical type such as thermoplastic (TPR) or Kalvar recording material, the code pick-up means 67a to 67n may comprise a bank of photomultiplier tubes having optical means for identifying ripple codes which may be generated either by a scanning, recording electron beam or a plurality of electron beams replacing respective of the recording transducers 40a to 40n. Said recording transducers are preferably closely spaced behind the reproduction transducers 67 which, if the member 100 is a magnetic recording member, may comprise the same transducing heads for both the recording and reproduction of said code signals with the particular mode of operation depending on the manner in which the individual transducing heads are energized.

If a single electron beam is utilized to generate the parallel codes by sweeping across the code recording area 100' of member 100, the code may be provided as an analog signal for intensity modulating the beam and may be held in storage in a storage device such as a recording member which is activated to generate said analog signal when the output 44' of an AND circuit 44 becomes activated. For thermoplastic recording the transducers 40a to 40n may comprise a plurality of electrodes in the form of wires disposed closely adjacent member 100 over the tracks C3 to Cn which transducers are simultaneously pulsed or energized when the code generator means 45 becomes activated to provide pulse charges across the recording member in the desired coding array. Similarly, if a plurality of electron beams are provided with at least one beam scanning each of the coding tracks C3 to Cn, they may be held inactive or at a low intensity level until the code generator means 45 becomes activated where upon parallel pulse signals are generated on the intensity inputs of each of same beams to generate said parallel code across 100. The plurality of code generating electron beams may also be deflection controlled to simultaneously move along parallel paths to seek code recording areas if the recording member 100 is held stationary in an information storage system in which the recording and reproduction is effected by respectively deflection controlling writing and reading electron beams. It is also noted that a recording and reproduction system may be provided utilizing an erasable recording material such as thermoplastic (TPR) recording material in which a single electron beam is utilized for both selectively recording information on a thermoplastic recording member and reproducing selected information therefrom. During the recording functions the beam is generated at a high enough intensity to effect the generation of charge patterns in the storage layer of the recording member. During the reproduction function the beam is generated in such a manner as to provide a feedback signal for reading selected areas of the recording member.

If recording member 100 is optically scannable such as photographic film, TPR or heat developable film, pick-ups 67 may comprise a bank of photomultiplier tubes adapted to scan respective tracks or channels of the recording code areas.

A latitude of modificatiion and substitution is intended in the foregoing disclosure, and in certain instances some features of the invention will be used without a corresponding use of other features. Accordingly it is appropriate that the appended claims be construed broadly and in a manner consistent with the spirit and scope of the invention.

I claim:

1. A method for recording a series of discontinuous images in spaced relationship along a continuous magnetic tape so as to produce a signal-bearing tape adapted to be played continuously and thereby provide a sequential display of said images and produce the illusion of animation, comprising: providing a first image showing an arrangement at a first instant in time; scanning said first image with a scanner to produce a recordable signal at a recording head; relatively moving said tape and recording head along the axis of length of the tape during the scanning operation at a rate of movement proportional to the rate of tape movement during playback and recording the signal on the tape until the image is scanned and recorded on a first portion of the tape; stopping said relative movement; and then providing second and successive images representing the appearance of said arrangement at later, discrete and discontinuous second and successive instants in time, and re-establishing said relative movement and repeating the scanning and recording processes on second and successive portions of the tape spaced from said first portion for each of said second and successive images so as to produce a sequence of adjacent magnetically reproducible representations of said images on said tape, whereby upon playback of the tape, the images are visually reproducible at evenly spaced intervals of time to produce an animated sequence of visible images.

2. A method according to claim 1 in which the tape is moved relative to the recording head, the recording head being restrained against movement in the direction of tape movement, to record the images, the tape being brought up to recording speed before recording each image, and stopped and reversed after each image is recorded by a distance such that the tape will be up to speed when the next image is recorded.

3. A method according to claim 1 in which the recording head is moved relative to the tape during recording of an image, the tape being held stationary at that time, the tape being stepped between each recording by the distance needed to record an image.

4. A method for recording a series of discontinuous images in spaced relationship along a continuous magnetic tape so as to produce a signal-bearing tape comprising: providing a first image showing a first arrangement; scanning said first image with a scanner to produce a recordable signal at a recording head; relatively moving said tape and recording head along the axis of length of the tape during the scanning operation at a rate of movement proportional to the rate of tape movement during playback and recording the signal on the tape until the image is scanned and recorded on a first portion of the tape; stopping said relative movement; and then providing second and successive images, discontinuous from the first and other images, and re-establishing said relative movement and repeating the scanning and recording processes on second and successive portions of the tape spaced from the first portion for each of said images so as to produce a sequence of adjacent magnetically reproducible representations of said images on said tape.

5. A method according to claim 4 in which the tape is moved relative to the recording head, the recording head being restrained against movement in the direction of tape movement, to record the images, the tape being brought up to recording speed before recording each image, and stopped and reversed after each image is recorded by a distance such that the tape will be up to speed when the next image is recorded.

6. A method according to claim 4 in which the recording head is moved relative to the tape during the recording of an image, the tape being held stationary at that time, the tape being stepped between each recording by the distance needed to record and image.

7. A method for providing a series of discontinuous image recordings along an eraseable recording member comprising the steps of placing a first image in the viewing field of a video camera having a picture signal output operatively coupled to a recording head positioned to record upon said recording member, selecting a first area of said recording member on which to record, relatively moving said recording member and said recording head at a recording speed when said recording head is positioned to record upon said first area, actuating said camera while said relative movement takes place and said recording head is positioned to record upon said first area, stopping said relative movement, and then providing second and successive images in said viewing field, selecting different areas of said recording member for each of said second and successive images and repeating the steps previously recited for said first image for each of said second and successive images.

8. The method of claim 7 in which the video camera includes a scanner for said viewing field and there is relative motion between said recording member and said recording head prior to triggering of said scanner.

9. A method of claim 8 in which a signal to trigger said scanner is transmitted thereto when said recording head initially is in recording position relative to the area selected for recording.

10. The method of claim 9 in which a signal to trigger said scanner is stored in said recording member for each area thereof.

11. The method of claim 10 in which a trigger signal for a particular area is recorded at the time recording is affected at a preceding area.

12. A method for recording video information in a record member and transducing selective portions of said information to respective monitorable still images, said method comprising the steps of generating a first video signal, recording said first video signal on a first portion of said record member, generating and predeterminately recording a first code on said record member for locating and identifying the recording of said first video signal, repeating the preceding steps to generate and record a plurality of additional video signals and respective codes each of which codes identifies and defines the location of a respective of said additional video signals, and when it is desired to monitor the information contained in a selected of said recorded video signals, selectively reproducing the code signal which identifies and locates that video signal containing the selected information and employing such code signal to effect the selective application of its associated video signal to a display means operable for generating images and employing such video signal to generate an image defining the information therein on said display means.

13. A method in accordance with claim 12 wherein a plurality of different codes are recorded each of which define information contained in one of said recorded video signals wherein each of the plurality of codes differs from each other and is related to a different characteristic of the associated video signal defined thereby.

14. A method for recording a plurality of discrete document signals with respect to an erasable record member as a series of discontinuous video signals comprising the steps of placing a first document in the scanning field of a video scanner having an output operatively connected to a recording transducer which transducer is operably positioned to record signals in said record member, selecting a first area of said record member on which to first effect a recording, controlling relative movement between said transducer and said record member, activating said transducer while such relative movement is effected and, when the leading edge of said first video signal recording area and said transducer are aligned with each other, automatically controlling said video scanner to scan said first document and to generate a first video signal on its output, gating said first video signal to said transducer as relative movement is continued between said transducer and said record member so as to cause said trasducer to record said video signal on a select portion of said record member, and repeating the aforesaid steps a plurality of times with respect to a plurality of additional documents to effect a plurality of video document recordings at other locations of said record member.

15. A method of searching a record member having plural discrete video information signals recorded in tandem array on selected lengths of said record member comprising the steps of generating and recording a plurality of codes along respective portions of parallel tracks of said record member wherein at least one of said codes is provided at a predetermined location and may be reproduced from said record member to identify a respective recorded information signal, providing a comparator means having at least two sets of parallel inputs, reproducing such codes as electrical signals by scanning said record member with a transducing means as relative movement is effected between said record member and said transducing means, passing each reproduced code to a first set of said parallel inputs and applying said codes to energize said first set of parallel inputs, and energizing the other set of said parallel inputs while retaining said comparator energized until the code present at said first set of inputs is the same as the code applied to said other set of parallel inputs, generating a control signal when both the codes presented to said comparator are the same, employing said control signal to control and effect the reproduction of a selected information signal from said record member and its generation on an output circuit, and applying such selectively reproduced information signal to a visual monitor and generating an image defined by the selectively reproduced information signal applied to said monitor.

16. A method of recording parallel codes along tandem lateral areas of a code recording portion of a record member having codes recorded on said code recording portion and a plurality of information recordings recorded adjacent said code recording portion comprising the steps of relatively moving said record member and a plurality of transducers including a plurality of code recording transducers, generating feedback signals by scanning codes recorded on said code recording portion, comparing said feedback signals with an address code, generating a control signal when the feedback signals match the address code and using said control signal to activate and control generating means to generate and record a selected code on a selected portion of said record member.

17. Apparatus for selectively recording codes on a record member locating and identifying a plurality of information containing frame locations wherein said record member already contains previously recorded thereon a plurality of separately reproducible codes for identifying frames previously recorded comprising code recording means, code generating means operatively connected to said code recording means, first means for scanning a code bearing area of said record member to produce codes therefrom, comparator means operatively connected to receive signals from said first means, control signal generating means associated with said comparator means for generating a control signal when a predetermined code is reproduced by said first means and control means responsive to the control signal generated by said comparator means and operatively to activate said code generating means when such control signal is generated to effect generation of a code by said generating means and means for passing said code to said code recording means to cause said code to be recorded in a predetermined portion of said record member for identifying a selected frame of information recorded therein.

18. An apparatus for selectively recording codes at selected locations of a record member comprising in combination: a record member having a plurality of information containing locations, first means for scanning information contained in said inforation containing locations, means for recording codes in said record member, means for relatively moving said first means and said record member, signal generating means operative when a selected location of said record member is moved relative to said first means to generate a pulse signal each time a selected portion of said record member passes said first means, presettable counting means operatively connected to receive said pulse signals, code generating means, said counting means being operatively connected to said code generating means for causing the latter to generate and transmit codes to said code recording means, means for presetting said counting means to cause said counting means to generate a control signal upon uncounting and means for initiating relative movement between said record member and said first means to cause said first means to generate feedback signals for use in uncounting said counting means whereby, when a selected number of pulses is received by said counting means, said counting means will generate a signal for activating said code generating means and said code generating means will generate a code and means for recording the code generated by said code generating means in a selected portion of said record member.

19. Apparatus for storing, reproducing and displaying video information comprising in combination:
first means for storing video information as a plurality of discrete recordings of video signals defining frames of still images,
second means for selectively reproducing selected ones of said discrete recordings and generating electrical signals representative of said selectively reproduced recordings,
third means including a television receiver having a viewing screen with a short persistence phosphor image generating means requiring restorative information signal scanning at a fixed rate to maintain an image of such information on said viewing screen to permit the image to be visually monitored,
fourth means connected to said television receiver for receiving and storing signals generated by said second means,
fifth means for reproducing signals stored by said fourth means at a fixed frequency equal to the restorative information signal scanning rate required to maintain an image on said viewing screen of said television receiver,
sixth means for transmitting the signals reproduced from said fifth means to said television receiver to effect the generation and retention of images on its viewing screen for a sufficient period of time to permit a person viewing said screen to visually study and monitor the information defined by the video signal selectively reproduced from said first means, and
seventh means for controlling the operation of said fifth means to cause it to erase signals recorded therein permitta new information signal to be selectively reproduced from said first means by said second means and applied to said fourth means and to be reproduced therefrom and employed to effect generation of respective still images on the display screen of said television receiver.

20. An apparatus in accordance with claim 19 wherein said fourth means includes an endless erasable record member, reproduction scanning means defining said fourth means, and means for effecting relative movement between said endless record member and said reproduction scanning means to permit said reproduction scanning means to repeatedly scan and reproduce the same picture signals from said endless record member at said fixed frequency.

21. A method of storing, reproducing and displaying video information comprising:
storing video information as a plurality of discrete picture signal recordings at selected frame storage locations of a video storage means, and
when it is desired to visually read and study the information contained in a selected frame location, selectively reproducing the picture signal recording from said selected frame location and generating electrical signals representative of such picture signal recording,
passing said reproduced electrical signals to a further signal storage means and storing a representation of the information defined by said electrical signals in said further signal storage means,
thereafter generating further electrical signals representative of the selectively reproduced signal recording by repeatedly reproducing at a fixed frequency said further electrical signals from the signals stored in said further signal storage means, and
applying said further electrical signals generated by reproduction from said further signal storage means to a television receiver having a viewing screen defined by a short persistence phosphor image generating means wherein the frequency at which said further electrical signals are generated is such as to effect the retention of a still image on the viewing screen of said television receiver by the repeated scanning of the phosphor image generating means thereof which image is a video representation of the information contained in the picture signal recording reproduced from the selected frame storage location of said video storage means.

22. A method for recording a series of discontinuous image recordings in an erasable recording member and reproducing selected of such recordings in visually monitorable form comprising:
generating first electrical signals defining video information containing picture generating signal elements and synchronizing signal elements capable of generating an image on a viewing screen of a video receiver,
selecting a first portion of said record member in which to record said first video information signal,
transducing said first video information signal to record same at said first location of said record member, selecting a plurality of additional portions of said record member for storing second and successive discontinuous video information signals, generating a second video information signal and additional video information signals and repeating the steps previously recited for transducing and respectively recording said signals in said additional portions of said record member to provide a series of video recordings in said record member, when it is desired to monitor the information of a selected video information signal recorded in said record member, selectively reproducing the selected video information recording from said record member by generating electrical signals representative of such recording, and repeatedly presenting said latter electrical signals to a television receiver having a short image persistency viewing screen at a frequency necessary to generate and retain an image of the information contained in said selected video information signal on said viewing screen of said receiver.

23. A method in accordance with claim 22 wherein the latter step of repeatedly presenting said selectively reproduced video information signal to said television receiver is effected by recording said selected video signal in a buffer and repeatedly reproducing said recorded video information signal from said buffer at said frequency necessary to generate and retain an image on said viewing screen of said television receiver and applying said repeatedly reproduced video information signal to the input of said television receiver to generate a still image on the viewing screen thereof.

24. A method of recording and reproducing document information comprising:

generating a plurality of frame video signals each containing picture signal elements representative of respective frames of document information, generating a plurality of codes in the form of electrical signals including at least one code for each of said frame video signals, which code defines a characteristic of its frame video signal, simultaneously recording each of said frame video signals and a corresponding code at respective locations of a memory such that each recorded code defines a respective video signal and its location in said memory, and when it is desired to selectively reproduce a video signal representative of selected recorded information, generating a selection code and applying said selection code to a comparison circuit, and reproducing said plurality of codes from the memory recordings thereof and generating a control signal when the selection code and a corresponding code reproduced from said memory are the same and applying said control signal to control and effect the reproduction of a selected video signal from said memory, and repeatedly presenting the selected video signal to a video monitor having a short persistency image viewing screen wherein the repition rate at which said video signal is presented to said monitor is such as to retain a still image generated on said viewing screen.

25. A method for providing a series of discontinuous video image recordings in an erasable record member comprising:

generating a first code as electrical signals, generating a first video information signal containing picture generating elements and synchronizing signals capable of generating when applied to a television receiver an image on a viewing screen thereof, selecting first and second portions of said record member in which to respectively record said first code and said first video information signal, transducing said first code and video information signal to record same respectively in said first and second portions of said record member, thereafter generating additional code signals and respective video information signals and repeating the steps previously recited for recording said first code and first video information signal to provide a series of discontinuous video information signal recordings in said record member, and when it is desired to selectively reproduce one of said video information signal recordings from said record member, scanning the recordings of said code signals and transducing said code signals to electrical signals, and comparing said code electrical signals with a code representative of a selected video signal recording and generating a control signal when a match is effected, thereafter employing said control signal to effect the transducing of said selected video information signal to electrical signals and applying said latter electrical signals to generate a monitorable still image on the viewing screen of a television receiver having a short image persistency by generating said information electrical signals repeatedly and applying same to said television receiver to maintain the still image in monitorable form on the viewing screen thereof.

* * * * *

// REEXAMINATION CERTIFICATE (1424th)

United States Patent [19]
Lemelson

[11] B1 4,213,163
[45] Certificate Issued Mar. 5, 1991

[54] VIDEO-TAPE RECORDING

[76] Inventor: Jerome H. Lemelson, 85 Rector St., Metuchen, N.J. 08840

Reexamination Request:
No. 90/001,844, Sep. 12, 1989

Reexamination Certificate for:
Patent No.: 4,213,163
Issued: Jul. 15, 1980
Appl. No.: 225,173
Filed: Aug. 27, 1962

[51] Int. Cl.$^5$ ................................................ H04N 5/78
[52] U.S. Cl. ........................................ 360/35.1; 360/13
[58] Field of Search ............................ 360/35.1, 10.1; 358/313

[56] References Cited

U.S. PATENT DOCUMENTS

| | | |
|---|---|---|
| 2,295,000 | 9/1942 | Morse . |
| 2,540,654 | 2/1951 | Cohen . |
| 2,611,813 | 9/1952 | Sharpless et al. .................. 177/353 |
| 2,771,595 | 11/1956 | Hendrickson . |
| 2,783,454 | 2/1957 | North . |
| 2,923,921 | 2/1960 | Shapin . |
| 2,954,546 | 9/1960 | Burns et al. . |
| 2,969,525 | 1/1961 | Hill . |
| 3,051,777 | 8/1962 | Lemelson ............................ 360/35.1 |
| 3,241,120 | 3/1966 | Amdahl . |
| 3,517,391 | 6/1970 | Lentz ................................. 340/172.5 |
| 4,218,163 | 7/1980 | Lemelson ............................ 360/35.1 |

FOREIGN PATENT DOCUMENTS

812468  4/1959  United Kingdom .

OTHER PUBLICATIONS

Page 1459-Proceedings of the IRE dated 12/48, entitled "A Digital Computer for Scientific Applications".
April 1954 Edition–"Journal of the Association for Computing Machinery", DYSEAC Article.
"A New Digital System For Editing TV Tape", W. Haneman and H. Ostrow, pub. in Aug.-Sep. 1961, RCA Engineer.
"New Products and Developments," pub. in Jun., 1961 Ed. of 37 Journal of the Society for Motion and Television Engineers.
"The Design, Construction, and Performance of a Large-Scale General Purpose Digital Computer," pub. in Feb., 1952 Ed. of Review of Electronic Digital Computers.
"A High Speed Magnetic-Core Output Printer," pub. sometime in 1953 in the Proceedings of the Association for Computing Machinery.
"Television Tape Editing System" pub. in the Institution of Electrical Engineers in Jun., 1963 and presented at a conference on Jun. 4, 1962.
"System Specifications for the Dyseac" by Alan L. Leiner, pub. Journal of the Association for Computing Machinery, Apr. 1954, vol. 1, No. 2, pp. 57-81.
"System Organization of the Dyseac" by A. L. Leiner and S. N. Alexander, pub. Transactions of the I.R.E., Professional Group on Electronic Computers, Mar. 1954, vol. EC-3, No. 1, pp. 1-10.
Excerpt from the "Reference Data for Radio Engineers," pp. 17-34 to 17-37 (6th Edition 1977).
Excerpts from "Theory and Design of Televaision Receivers" by Sid Deutsch, 1951, Chapter 1, pp. 1-29, McGraw-Hill Book Company, Inc., New York.

*Primary Examiner*—Robert L. Richardson

[57] ABSTRACT

Single frame video signals are recorded on selected areas of a recording medium, with accompanying recorded code signals associated with each frame.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION IT HAS BEEN DETERMINED THAT:

The patentability of claims 1-11, 14, 16, 18, and 21-24 is confirmed.

Claim 13 is cancelled.

Claims 12, 15, 17, 19 and 25 are determined to be patentable as amended.

Claim 20, dependent on an amended claim, is determined to be patentable.

New claims 26-73 are added and determined to be patentable.

12. A method for recording video information in a record member and transducing selective portions of said information to respective monitorable still images, said method comprising the steps of generating a first video signal, recording said first video signal on a first portion of said record member, generating and predeterminately recording a first *identifying* code on said record member for locating and identifying the recording of said first video signal, repeating the preceding steps to generate and record a plurality of additional video signals and respective *identifying* codes each of which codes identifies and defines the location of a respective of said additional video signals, and when it is desired to monitor the information contained in a selected of said recorded video signals, selectively reproducing the *identifying* code signal which identifies and locates that video signal containing the selected information and employing such *identifying* code signal to effect the selective application of its associated video signal to a display means operable for generating images and employing such video signal to generate an image defining the information therein on said display,
*wherein a plurality of different characteristic codes are recorded each of which define information contained in one of said recorded video signals wherein each of the plurality of different characteristic codes differs from each other and is related to a different characteristic other than location of the video signal defined thereby.*

15. A method of searching a record member having plural discrete video information signals recorded in tandem array on selected lengths of said record member comprising the steps of generating and recording a plurality of *different characteristic* codes *each related to a different characteristic of each of the discrete video information signals other than its location and a plurality of identifying codes each for locating and identifying a discrete video information signal on said record member, said recording being* along respective portions of parallel tracks of said record member wherein at least one of said *identifying* codes is provided at a predetermined location and may be reproduced from said record member to identify a respective recorded infomation signal, providing a comparator means having at least two sets of parallel inputs, reproducing such *different characteristic* codes as electrical signals by scanning said record member with a transducing means as relative movement is effected between said record member and said transducing means, passing each reproduced code to a first set of said parallel inputs and applying said codes to energize said first set of parallel inputs, and energizing the other set of said parallel inputs while retaining said comparator energized until the code present at said first set of inputs in the same as the code applied to said other set of parallel inputs, generating a control signal when both the codes presented to said comparator are the same, employing said control signal to control and effect the reproduction of a selected information signal from said record member and its generation on an output circuit, and applying such selectively reproduced information signal to a visual monitor and generating an image defined by the selectively reproduced information signal applied to said monitor.

17. Apparatus for selectively recording *identifying* codes *and different characteristic codes* on a record member, *said indentifying codes* locating and [identifying] *defining* a plurality of information containing frame locations, *said different characteristic codes being related to a characteristic other than location of the plurality of information,* wherein said record member already contains previously recorded thereon a plurality of separately reproducible *indentifying* codes for identifying frames previously recorded, *said apparatus* comprising code recording means, *identifying and different characteristic* code generating means operatively connected to said code recording means, first means for scanning a code bearing area of said record member to produce *different characteristic* codes therefrom, comparator means operatively connected to receive signals from said first means, control signal generating means associated with said comparator means for generating a control signal when a predetermined code is reproduced by said first means and control means responsive to the control signal generated by said comparator means and operatively to activate said code generating means when such control signal is generated to effect generation of [a] *an identifying* code by said generating means and means for passing said *identifying* code to said code recording means to cause said code to be recorded in a predetermined portion of said record member for identifying a selected frame of information recorded therein.

19. Apparatus for storing, reproducing and displaying video information comprising in combination:
first means for storing video information as a plurality of discrete recordings of video signals defining frames of still images,
second means for selectively reproducing selected ones of said discrete recordings and generating electrical signals representative of said selectively reproduced recordings,
third means including a television receiver having a viewing screen with a short persistence phosphor image generating means requiring restorative information signal scanning at a fixed rate to maintain an image of such information on said viewing screen to permit the image to be visually monitored, fourth means connected to said television receiver for receiving and storing signals generated by said second means, fifth means for reproducing signals stored by said fourth means at a fixed frequency equal to the restorative information signal scanning rate required to maintain an image on said viewing screen of said television receiver, sixth means for transmitting the signals reproduced from said fifth means to said television receiver to effect the generation and retention of images on its viewing screen for a sufficient period of time to permit a person viewing said screen to visually study and monitor the information defined by the video signal selectively reproduced from said first means, and seventh means for controlling the operation of said fifth means to cause it to erase signals recorded [therein permitta] *in said fourth means permitting* new information signal to be selectively reproduced from said first means by said second means and applied to said fourth means and to be reproduced therefrom and employed to effect generation of respective still images on the display screen of said television receiver.

25. A method for providing a series of discontinuous video image recordings in an erasable record member comprising:

generating a first code as electrical signals, generating a first video information signal containing picture generating elements and synchronizing signals capable of generating when applied to a television receiver an image on a viewing screen thereof, selecting first and second portions of said record member in which to respectively record said first code and said first video information signal, *said first code defining a characteristic other than the location of said first video information signal,* transducing said first code and video information signal to record same respectively in said first and second portions of said record member, thereafter generating additional *different characteristic* code signals and respective video information signals and repeating the steps previously recited for recording said first code and first video information signal to provide a series of discontinuous video information signal recordings in said record member, *each of said additional different characteristic code signals defining a characteristic other than location of said respective video information signals,* and

*generating and recording on said record member identifying codes each of which identifies and locates one of said video information signals on said record member,* when it is desired to selectively reproduce one of said video information signal recordings from said record member, scanning the recordings of said *first and additional* code signals and transducing said code signals to electrical signals, and comparing said code electrical signals with a code representative of a selected video signal recording and generating a control signal when a match is effected, thereafter employing said control signal to effect the transducing of said selected video information signal to electrical signals and applying said latter electrical signals to generate a monitorable still image on the viewing screen of a television receiver having a short image persistency by generating said information electrical signals repeatedly and applying same to said television receiver to maintain the still image in monitorable form on the viewing screen thereof.

26. *A method in accordance with claim 12 wherein each of said different characteristic codes are binary codes generated by manually operating a code generating switch means.*

27. *A method in accordance with claim 12 wherein said video signals recorded on said respective portions of said record member consist of business record document information and the images generated thereby on said display means are still images of defining respective documents.*

28. *A method in accordance with claim 12 wherein said record member is a multiple track record member and said identifying and different characteristic codes are recorded on a plurality of tracks of said record member.*

29. *A method in accordance with claim 12 wherein said record member is a multiple parallel track magnetic recording member said first video signal is recorded on a first track of said record member and said identifying and characteristic codes are recorded on one or more other tracks parallel to the recording of said first video signal.*

30. *A method in accordance with claim 12 wherein said identifying code signal is reproduced from said record member along with a plurality of other code signals from said record member and wherein all of the code signals reproduced from said record member are applied to said code matching means.*

31. *A method in accordance with claim 12 and including:*

(a) *reproducing a selected video signal from said record member;*

(b) *recording information representing said reproduced video signal in a further signal storage means;*

(c) *repeatedly reproducing said information from said further storage means as further electrical signals at a fixed frequency; and*

(d) *applying said repeatedly reproduced signals to a video display means which is a television receiver with a viewing screen having a short image persistency;*

(e) *wherein said reproduced further signals are generated on the output of said further storage means at a frequency sufficient to generate a still image defined by said further signals.*

32. *A method in accordance with claim 31 wherein,* to monitor the information contained in a second video signal stored in said record member, repeating steps (a) to (e) with respect to a second associated video signal stored in said record member after erasing the further signals recorded in said further storage means.

33. *A method in accordance with claim 31 wherein said display means is a cathode ray tube (CRT) and said fixed frequency is generated to control the write beam of said CRT to scan the image field of the viewing screen at a rate of sixty times per second.*

34. *A method in accordance with claim 12 wherein said record member is a magnetic tape and said first and additional video signals are recorded along selected lengths of said tape.*

35. *A method in accordance with claim 34 and including the step of recording said first and additional video signals using a magnetic recording head.*

36. A method in accordance with claim 12 wherein said first and additional video signals are recorded on said record member as optically scannable recordings, said method including employing said identifying code signal reproduced from said record member to effect said selective application of said associated video signal by optically scanning said video signal recordings.

37. A method in accordance with claim 36 including the step of optically scanning the said video signal recordings with at least one photoelectric means to convert the optical recording into an electric signal.

38. A method in accordance with claim 37 wherein said photoelectric means is a photomultiplier tube.

39. A method in accordance with claim 15 and including:
   (a) reproducing selected information from said record member in the form of selected information signals;
   (b) recording further information representing said selected information signals in a further signal storage means;
   (c) repeatedly reproducing electrical signals representing said further information from said further storage means at a fixed frequency; and
   (d) applying said repeatedly reproduced electrical signals to a television receiver signal monitor having a video display means with a viewing screen having a short image persistency;
   (e) wherein said repeatedly reproduced electrical signals are generated on the output of said further storage means at a frequency sufficient to generate and retain a still image on said screen for a time interval sufficient to permit a person to monitor said still image.

40. A method in accordance with claim 39 wherein, to monitor second selected information recorded on said record member, repeating steps (a) to (e) with respect to said second selected information and erasing the first further information stored in said further storage means.

41. A method in accordance with claim 39 wherein each of said selected information signals contain document information and the still image generated on said viewing screen is an image of a document.

42. A method in accordance with claim 39 wherein said fixed frequency is generated for scanning of the image field of the viewing screen at a rate of sixty times per second.

43. A method in accordance with claim 39 wherein said television receiver signal monitor is a conventional video receiver similar to a conventional home T.V. receiver.

44. A method in accordance with claim 15 wherein said recording of said characteristic and identifying codes is effected by a beam.

45. A method in accordance with claim 15 wherein said recording of said characteristic and identifying codes on said record member is effected by magnetic recording while said record member is in motion.

46. A method in accordance with claim 15 wherein the steps of reproducing said different characteristic codes and identifying codes as electrical signals are effected by scanning said record member with an optical scanning means.

47. Apparatus in accordance with claim 17 and including:
   (a) transducer means to read said information recorded on said record member;
   (b) display means including a television receiver having a viewing screen with a short persistence image generating means requiring restorative information signal scanning at a fixed rate to maintain an image of information on said viewing screen to permit the image to be visually monitored;
   (c) buffer means connected to said transducer means for receiving and storing signals representing an image and connected to said television receiver, means for reproducing signals from said buffer means at a fixed frequency equal to the restorative information signal scanning rate required to maintain an image on said viewing screen of said television receiver; and
   (d) television control means for applying the signals reproduced from said buffer means to said television receiver to effect the generation and retention of images on its viewing screen for a sufficient period of time to permit a person viewing said screen to visually study and monitor said image.

48. Apparatus in accordance with claim 47 wherein said television receiver includes a write beam having a starting position and said reproduction means controls said television control means to return said write beam to said starting position at a rate of 60 times per second.

49. Apparatus in accordance with claim 47 wherein said record member is a magnetic recording disc member and said code recording means is a magnetic transducing head.

50. Apparatus in accordance with claim 49 wherein said predetermined portion of said record member is a first magnetic track and said selected frame location recorded therein is recorded in a second magnetic track parallel with said first magnetic track.

51. Apparatus in accordance with claim 47 wherein said code generating means is operable to generate said codes as binary codes.

52. Apparatus in accordance with claim 17 wherein said first means for scanning a code bearing area of said record member comprises an optical scanning means.

53. Apparatus in accordance with claim 17 wherein said record member contains optically scannable information recorded thereon and said code recording means is operable to optically record said codes on said record member.

54. An apparatus in accordance with claim 19 wherein said first means includes a disc magnetic record member and said second means includes transducing means for reading signals recorded on said disc magnetic record member.

55. An apparatus in accordance with claim 54 wherein said magnetic record member contains multiple parallel record tracks, said video information being stored on at least one of said record tracks, and said apparatus includes code recording means to generate and record code signals providing different characteristic information as to each discrete recording, said code signals being stored on at least one other record track.

56. An apparatus in accordance with claim 55 wherein said code recording means records codes for locating and identifying respective of said video signals at select locations of magnetic tracks and for indicating the starting location thereof.

57. An apparatus in accordance with claim 19 wherein said fourth means comprises a buffer operable to receive and store signals received from said second means.

58. An apparatus in accordance with claim 57 wherein said sixth means transmits said video signals to said television receiver at a frequency to cause said transmitted signals to be generated as a still monitorable image which is readable by a person viewing said viewing screen.

59. An apparatus in accordance with claim 19 wherein said television receiver includes a cathode ray tube containing said viewing screen and including means for raster scanning said screen at 60 times per second.

60. Apparatus in accordance with claim 19 wherein said first means stores said video infomation in an optically scannable recording.

61. Apparatus in accordance with claim 19 wherein said television receiver is a conventional video receiver similar to a conventional home T.V. receiver.

62. A method in accordance with claim 21 wherein said further signal storage means comprises a buffer means to record the representation of the information defined by said electrical signals, and reproducing said representation of the information recorded in said buffer at said fixed frequency to generate and apply said further electrical signals to said television receiver.

63. A method in accordance with claim 21 wherein said frequency at which said further electrical signals are generated controls said television receiver to effect scanning the image field of the viewing screen thereof at a rate of sixty times per second to effect the retention of a still and monitorable image of document video information.

64. A method in accordance with claim 21 wherein said selective reproduction of information stored at said selected frame location of said video storage means is effected by generating and applying a select code to a code matching means operative to receive and match codes generated in scanning said frame storage locations.

65. A method in accordance with claim 21 wherein said television receiver is a conventional video receiver similar to a conventional home T.V. receiver.

66. A method in accordance with claim 21 wherein said plurality of picture signal recordings are recorded on said storage means as optically scannable recordings and said recordings are selectively reproduced from said storage means by optically scanning said recordings.

67. A method in accordance with claim 21 wherein said plurality of picture signal recordings are recorded on said storage means as optically scannable recordings and said recordings are selectively reproduced from said storage means by optically scanning said recordings.

68. A method in accordance with claim 22 wherein the step of repeatedly presenting said latter electrical signals to said television receiver is effected by recording electrical signals representing said selected video information reproduced from said record member in a buffer and controllably generating the signals recorded in said buffer as said latter electrical signals on the output of said buffer to retain a still image on said viewing screen.

69. A method in accordance with claim 68 which includes erasing said signals recorded in said buffer, selectively reproducing further video information signals from another portion of said record member and recording signals representing said further video information signals in said buffer and controllably generating additional further latter electrical signals on the output of said buffer repeatedly at a frequency necessary to generate and retain a still image of video information representing said further video information signals.

70. A method in accordance with claim 22 wherein the step of selectively reproducing select video information from select portions of said record member is effected by generating and applying a select code to a code matching means.

71. A method in accordance with claim 22 wherein said series of discontinuous image recordings are recorded in said recording member as optically scannable recordings and are selectively reproduced therefrom by optically scanning selected of said discontinuous image recordings and generating said electrical signals representative of such image recordings.

72. A method in accordance with claim 22 wherein said series of discontinuous image recordings are recorded in said recording member as optically scannable recordings and are selectively reproduced therefrom by optically scanning selected of said discontinuous image recordings.

73. A method in accordance with claim 25 wherein first code and additional code signals are generated by selective manual operation of a code generating means.

* * * * *